United States Patent
Kelleher et al.

(10) Patent No.: US 11,261,964 B2
(45) Date of Patent: Mar. 1, 2022

(54) COMPLIANT SHIFTING MECHANISM AND MULTI-SPEED POWER TOOL HAVING SAME

(71) Applicant: Black & Decker, Inc., Newark, DE (US)

(72) Inventors: Joseph Patrick Kelleher, Parkville, MD (US); Louis Marvin Vasiliades, Baltimore, MD (US); Matthew Ronald Miller, Sewickley, PA (US)

(73) Assignee: Black & Decker Inc., New Britain, CT (US)

( * ) Notice: Subject to any disclaimer, the term of this patent is extended or adjusted under 35 U.S.C. 154(b) by 802 days.

(21) Appl. No.: 15/982,802

(22) Filed: May 17, 2018

(65) Prior Publication Data

US 2019/0353245 A1 Nov. 21, 2019

(51) Int. Cl.
*F16H 63/04* (2006.01)
*B23B 45/00* (2006.01)
*F16H 63/30* (2006.01)
*B25F 5/00* (2006.01)

(52) U.S. Cl.
CPC ........... *F16H 63/04* (2013.01); *B23B 45/008* (2013.01); *B25F 5/001* (2013.01); *F16H 2063/3089* (2013.01)

(58) Field of Classification Search
CPC ............. F16H 63/04; F16H 2063/3089; B23B 45/008; B25F 5/001
USPC ............ 74/56, 337.5, 470, 473.28; 464/161; 173/170, 48, 216
See application file for complete search history.

(56) References Cited

U.S. PATENT DOCUMENTS

| | | | |
|---|---|---|---|
| 1,240,065 A * | 9/1917 | Lord | F16D 3/12 464/161 |
| 1,640,894 A * | 8/1927 | Hebert | F16D 3/12 464/161 |
| 3,301,971 A | 1/1967 | Johnson | |
| 3,370,477 A * | 2/1968 | Lewis | F16H 63/18 74/337.5 |
| 3,500,696 A | 3/1970 | Berube | |

(Continued)

FOREIGN PATENT DOCUMENTS

| | | | |
|---|---|---|---|
| CN | 101622104 | * | 1/2010 |
| DE | 3618024 | * | 12/1987 |

(Continued)

*Primary Examiner* — William C Joyce
(74) *Attorney, Agent, or Firm* — Scott B. Markow

(57) ABSTRACT

A multi-directional compliant shifting mechanism for a multi-speed power tool may couple a movable selector to a power transmission system of the tool, for selecting an operational speed of the multi-speed power tool. The complaint shifting mechanism may provide shifting compliance in a first direction in response to movement of the selector in a first direction, and may provide shifting compliance in a second direction in response to movement of the selector in a second direction. In one example, this multi-directional shifting compliance may be provided by interaction of the selector with a camming surface, in combination with a single compression spring. In another example, this multi-directional shifting compliance may be provided by first and second springs, selectively acting to provide compliance in the first and second directions.

19 Claims, 21 Drawing Sheets

(56) References Cited

U.S. PATENT DOCUMENTS

| | | | |
|---|---|---|---|
| 3,880,015 A * | 4/1975 | Kranzler | G05G 7/00 74/337.5 |
| 4,418,766 A | 12/1983 | Grossmann | |
| 4,704,916 A * | 11/1987 | Wilhelmy | F16H 61/24 74/473.26 |
| 5,460,253 A | 10/1995 | Ritter et al. | |
| 5,522,488 A | 6/1996 | Schwarzbich | |
| 5,842,527 A | 12/1998 | Arakawa et al. | |
| 5,992,257 A * | 11/1999 | Nemetz | B23B 45/008 464/67.1 |
| 6,192,996 B1 | 2/2001 | Sakaguchi et al. | |
| 6,520,267 B2 | 2/2003 | Fünfer et al. | |
| 6,610,938 B2 | 8/2003 | Fünfer | |
| 7,174,969 B2 | 2/2007 | Droste | |
| 7,287,600 B2 | 10/2007 | Braun | |
| 7,762,349 B2 | 7/2010 | Trautner et al. | |
| 8,028,760 B2 * | 10/2011 | Yoshikane | B25D 16/006 173/48 |
| 8,235,827 B2 * | 8/2012 | Shim | F16D 7/044 464/29 |
| 8,714,888 B2 | 5/2014 | Bean et al. | |
| 9,434,038 B2 | 9/2016 | Elger | |
| 9,463,563 B2 | 10/2016 | Takeuchi et al. | |
| 10,208,806 B2 * | 2/2019 | Li | B25J 19/063 |
| 2002/0014343 A1 * | 2/2002 | Funfer | B25D 16/006 173/48 |
| 2004/0231866 A1 * | 11/2004 | Droste | B25D 16/006 173/48 |

FOREIGN PATENT DOCUMENTS

| | | |
|---|---|---|
| EP | 1223270 A2 | 7/2002 |
| JP | 2007237355 A | 9/2007 |
| JP | 2013107142 A | 6/2013 |
| WO | WO 93/15863 * | 8/1993 |

* cited by examiner

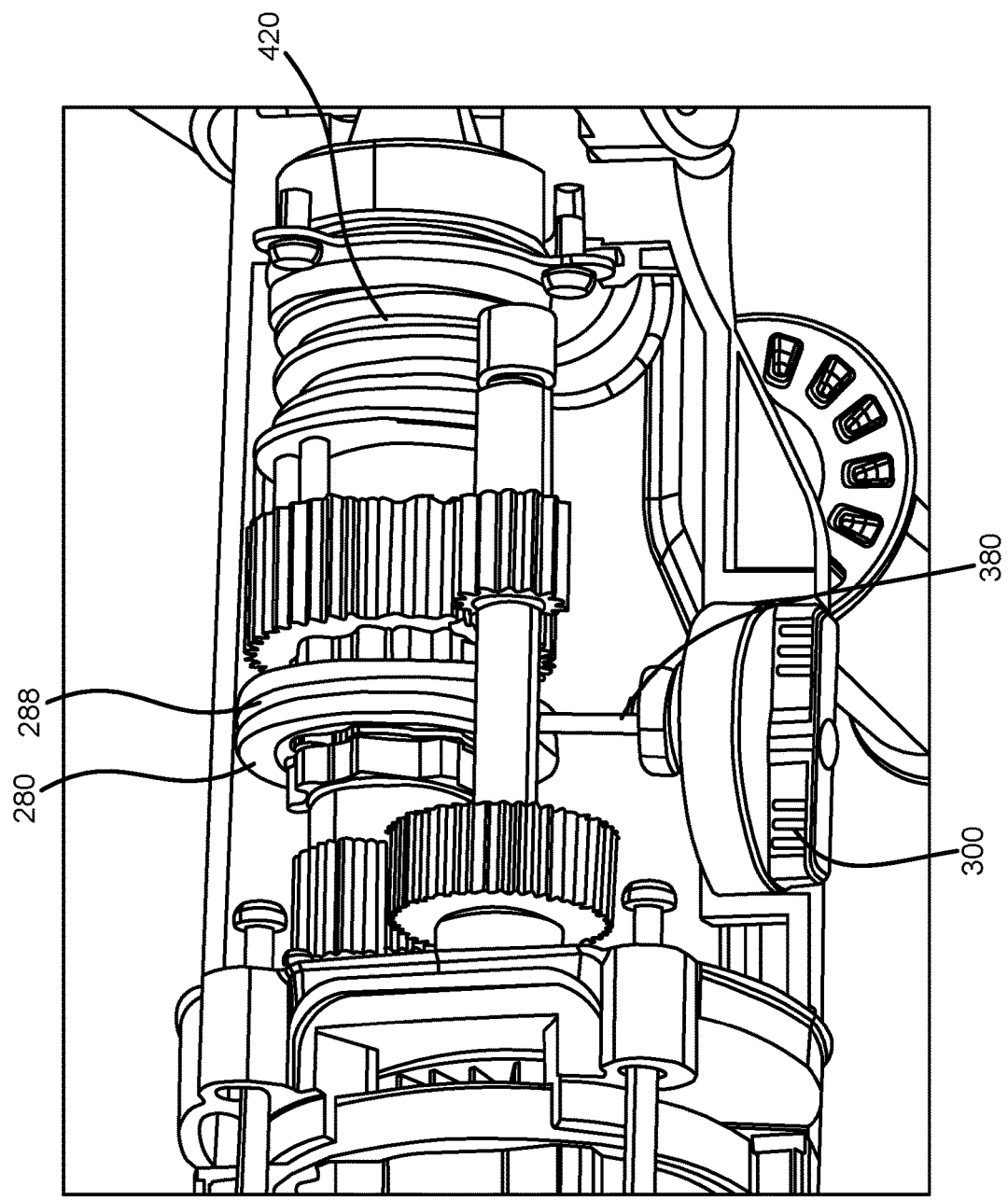

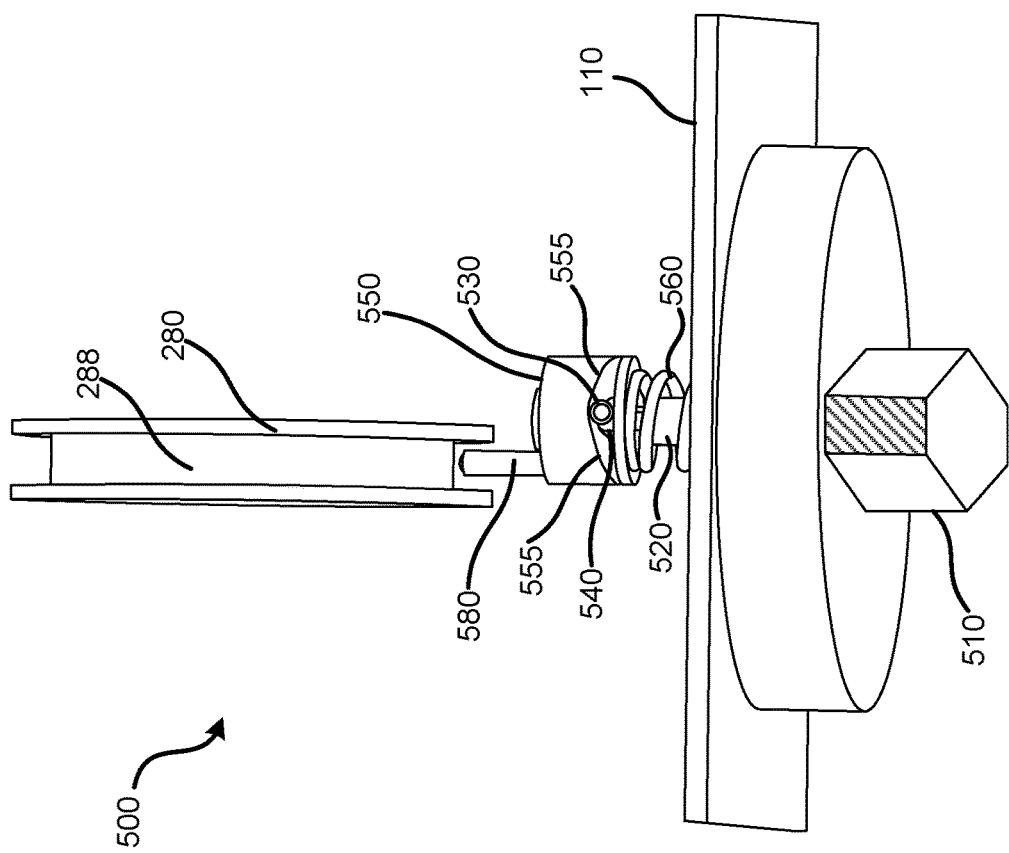

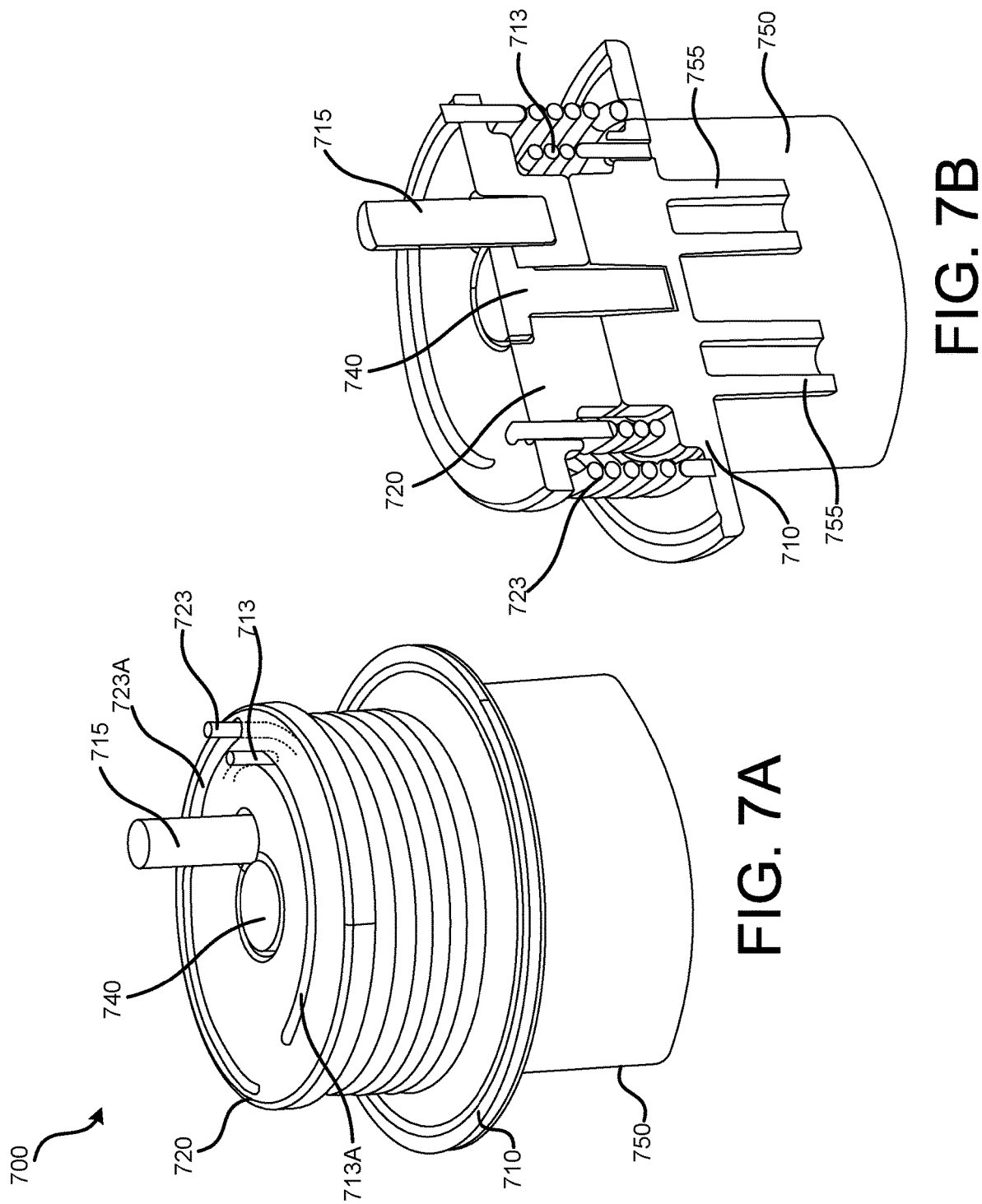

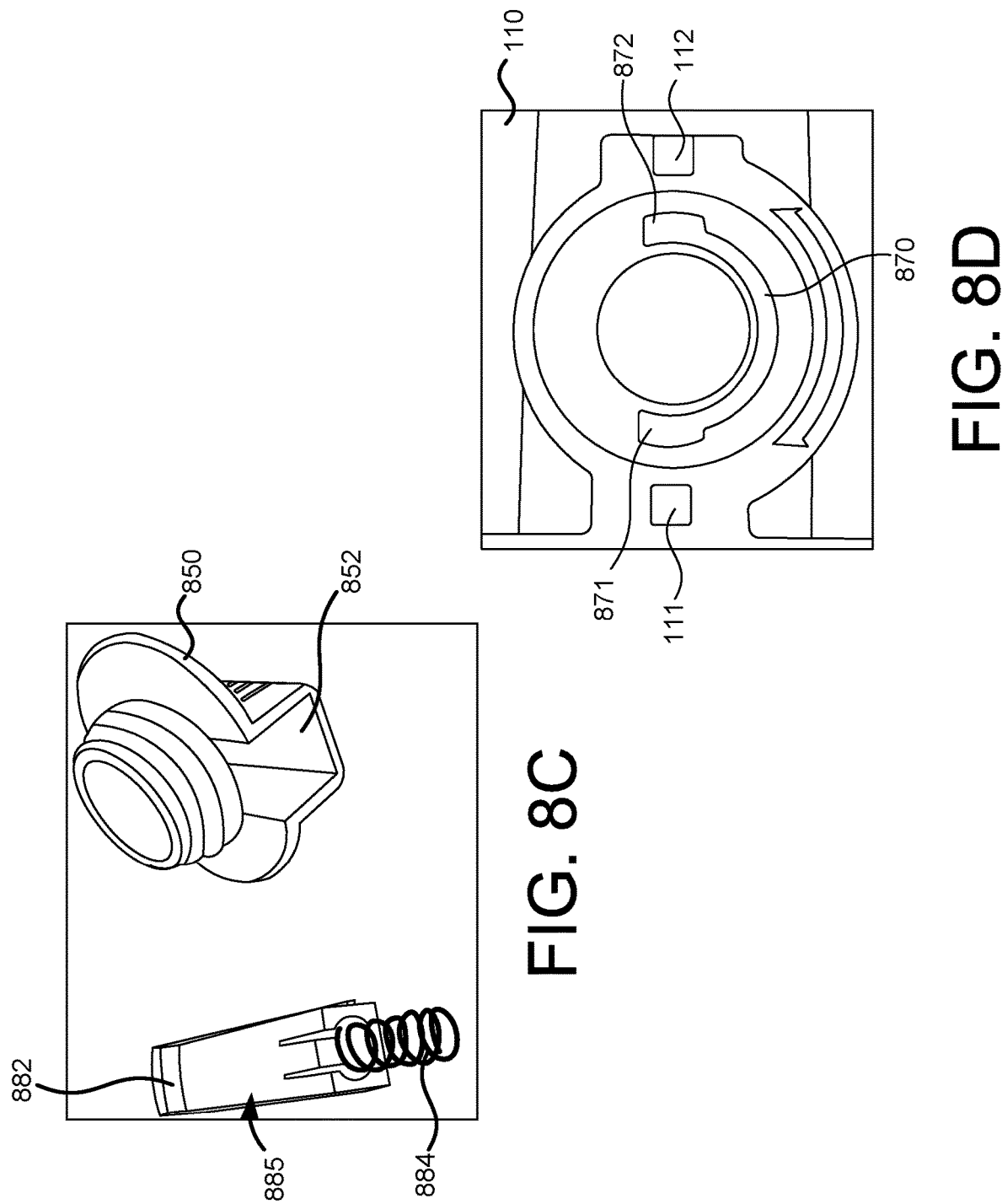

COMPLIANT SHIFTING MECHANISM AND MULTI-SPEED POWER TOOL HAVING SAME

FIELD

This document relates, generally, to a multi-speed power tool.

BACKGROUND

Multi-speed power tools may operate at multiple different speeds to, for example, accommodate different types of tasks, and/or allow different tasks to be performed at an appropriate operational speed for the particular task. Such multi-speed power tools may employ a parallel axis transmission system, in which power may be transmitted via a first gear arrangement for operation of the tool at a first speed, and via a second gear arrangement for operation of the tool at a second speed.

SUMMARY

In one aspect, a multi-directional compliant shifting mechanism for a multi-speed power tool may include a movable selector, a shaft having a first end portion thereof fixedly coupled to the selector, a camming mechanism provided at a second end portion of the shaft, an eccentric pin fixedly coupled to a first end portion of the camming mechanism and configured to cause a transmission of the power tool to shift between at least a first speed and a second speed, and a compression spring positioned between a second end portion of the camming mechanism and the selector. In response to movement of the selector to a first position, interaction of the camming mechanism with the compression spring biases the camming mechanism to provide shifting compliance in a first direction. In response to movement of the selector to a second position, interaction of the camming mechanism with the compression spring biases the camming mechanism to provide shifting compliance in a second direction opposite the first direction.

In some implementations, the camming mechanism may include a cam body coupled to the second end portion of the shaft, such that the cam body is axially fixed with respect to the shaft, and is rotatable relative to the shaft, a contoured cam surface defined on a first side of the cam body, facing the knob, wherein the eccentric pin is coupled to a second side of the cam body, opposite the first side thereof, and a cross-pin coupled to the shaft, such that the cross-pin is axially movable relative to the shaft, wherein the cross-pin is selectively movable along the contoured cam surface of the cam body. In some implementations, the cross-pin extends radially through an elongated axial slot defined in the shaft.

In some implementations, movement of the selector to the first position includes a movement of the selector from the second position to the first position, and, in response to the movement of the selector to the first position, the selector and the shaft are rotated by a first radial distance, rotation of the cam body and the eccentric pin are physically restricted such that the cam body and the eccentric pin are rotated by a second radial distance that is less than the first radial distance, and the cross-pin moves along a first portion of the contoured cam surface of the cam body, and moves in a first direction in the elongated axial slot so as to compress the compression spring. In some implementations, in response to removal of the physical restriction on rotation of the cam body and the eccentric pin, the cross-pin moves along a second portion of the contoured cam surface of the cam body, and moves in a second direction in the elongated axial slot so as to release the compression of the compression spring, and the cam body and the eccentric pin are rotated by a third radial distance, the second and the third radial distance being substantially equal to the first radial distance.

In some implementations, the movement of the selector to the second position comprises a movement of the selector from the first position to the second position, and, in response to the movement of the selector to the second position, the selector and the shaft are rotated by a first radial distance, rotation of the cam body and the eccentric pin are physically restricted by the eccentric pin such that the cam body and the eccentric pin are rotated by a second radial distance that is less than the first radial distance, and the cross-pin moves along a first portion of the contoured cam surface of the cam body, and moves in a first direction in the elongated axial slot so as to compress the compression spring. In some implementations, in response to removal of the physical restriction on rotation of the cam body and the eccentric pin, the cross-pin moves along a second portion of the contoured cam surface of the cam body, and moves in a second direction in the elongated axial slot so as to release the compression of the compression spring, and the cam body and the eccentric pin are rotated by a third radial distance, the rotation by the third radial distance added to the rotation by the second radial distance being substantially equal to the first radial distance.

In some implementations, the multi-directional compliant shifting mechanism may also include a plate positioned between the cross-pin and the first end portion of the compression spring, so as to maintain contact between the cross-pin and the contoured cam surface as the cross-pin moves along the contoured cam surface of the cam body, wherein movement of the cross-pin in a first direction along a first portion of the contoured surface of the cam body causes compression of the compression spring, and movement of the cross-pin in the first direction along a second portion of the contoured surface of the cam body, adjacent to the first portion thereof, releases the compression of the compression spring. In some implementations, movement of the cross-pin in a first direction along a first portion of the contoured surface of the cam body causes compression of the compression spring, and movement of the cross-pin in a second direction, opposite the first direction, along the first portion of the contoured surface of the cam body releases the compression of the compression spring.

In some implementations, the multi-directional compliant shifting mechanism may also include a retention device configured to selectively retain the movable selector in a selected one of the first position or the second position. The retention device may include a spring loaded retention button movably received in a channel defined in the selector. The retention button may include a body portion, a spring coupled to a proximal end portion of the body portion received in the channel of the selector, and a retention flange provided at a distal end portion of the body portion. The retention flange is configured to be movably received in a track defined in a housing of the tool, and to be retained in a first locking recess at a first end portion of the track so as to retain the selector in the first position, and to be retained in a second locking recess at a second end portion of the track so as to retain the selector in the second position.

In another aspect, a multi-directional compliant shifting mechanism for a multi-speed power tool may include a movable selector, a shaft having a first end portion thereof fixedly coupled to the selector, a first shift plate rotatably coupled to an intermediate portion of the shaft, a second shift plate rotatably coupled to a second end portion of the shaft, a shift member coupled to the second shift plate and configured to cause a transmission of the power tool to shift between at least a first speed and a second speed, a first torsion spring between the selector and the first shift plate, the first torsion spring having a first end portion thereof coupled to the selector and a second end portion thereof coupled to the first shift plate such that the first torsion spring is biased in a first direction, and a second torsion spring between the first shift plate and the second shift plate, the second torsion spring having a first end portion thereof coupled to the first shift plate and a second end portion thereof coupled to the second shift plate such that the second torsion spring is biased in a second direction, opposite the first direction. In response to movement of the selector to a first position, biasing of the first torsion spring in the first direction provides shifting compliance in a first direction, and in response to movement of the selector to a second position, biasing of the second torsion spring in the second direction provides shifting compliance in a second direction.

In some implementations, the multi-directional compliant shifting mechanism may also include a first eccentric pin having a first end thereof fixedly coupled to the selector and a second end thereof movably received in an arcuate slot defined in the first shift plate, a second eccentric pin having a first end thereof fixedly coupled to the first shift plate and a second end thereof movably received in an arcuate slot defined in the second shift plate, and a third eccentric pin having a first end thereof fixedly coupled to the second shift plate and coupled to the shift member. In some implementations, the movement of the selector to the first position includes a movement of the selector from the second position to the first position, and, in response to the movement of the selector to the first position, the selector, the first eccentric pin and the shaft are rotated by a first radial distance, the first shift plate and the second eccentric pin are rotated by the first radial distance, rotation of the second shift plate and the third eccentric pin are physically restricted such that the second and the third eccentric pin are rotated by a second radial distance that is less than the first radial distance, the first torsion spring is in a neutral state, and the second torsion spring is an actuated state.

In some implementations, in response to removal of the physical restriction on rotation of the third eccentric pin and the second shift plate, the third eccentric pin and the second shift plate are rotated by a third radial distance, the rotation by the third radial distance added to the rotation by the second radial distance being substantially equal to the first radial distance, such that the selector, the first and second shift plates, and the first, second and third eccentric pins are substantially equally rotated. In some implementations, in response to removal of the physical restriction on rotation of the third eccentric pin and the second shift plate and the rotation of the third eccentric pin and the second shift plate by the third radial distance, the first torsion spring remains in the neutral state, and the second torsion spring transitions from the actuated state to the neutral state.

In some implementations, the movement of the selector to the second position comprises a movement of the selector from the first position to the second position, and, in response to the movement of the selector to the second position, the selector, the first eccentric pin and the shaft are rotated by a first radial distance, rotation of the first shift plate, the second eccentric pin, the second shift plate and the third eccentric pin are physically restricted by the third eccentric pin such that the first shift plate, the second eccentric pin, the second shift plate, and the third eccentric pin are rotated by a second radial distance that is less than the first radial distance, the first torsion spring is in an actuated state, and the second torsion spring is in a neutral state. In some implementations, in response to removal of the physical restriction on rotation of the third eccentric pin, the first shift plate, the second eccentric pin, the second shift plate and the third eccentric pin are rotated by a third radial distance, the rotation by the third radial distance added to the rotation by the second radial distance being substantially equal to the first radial distance, such that the selector, the first and second shift plates, and the first, second and third eccentric pins are substantially equally rotated. In some implementations, in response to removal of the physical restriction on rotation of the third eccentric pin and the rotation of the first shift plate, the second eccentric pin, the second shift plate and the third eccentric pin by the third radial distance, the second torsion spring remains in the neutral state, and the first torsion spring transitions from the actuated state to the neutral state.

In some implementations, the multi-directional compliant shifting mechanism may also include a retention device configured to selectively retain the movable selector in a selected one of the first position or the second position. The retention device may include a spring loaded retention button movably received in a channel defined in the selector. The retention button may include a body portion, a spring coupled to a proximal end portion of the body portion received in the channel of the selector, and a retention flange provided at a distal end portion of the body portion. The retention flange may be configured to be movably received in a track defined in a housing of the tool, and to be retained in a first locking recess at a first end portion of the track so as to retain the selector in the first position, and to be retained in a second locking recess at a second end portion of the track so as to retain the selector in the second position.

In another aspect, a multi-directional compliant shifting mechanism for a multi-speed tool may include a rotatable selector, a first torsion spring coupled to the selector, wherein the first torsion spring is biased in a first direction, and a second torsion spring coupled to the selector, wherein the second torsion spring is biased in a second direction that is opposite the first direction. In response to rotation of the selector in a first direction to shift to a first mode of operation, biasing of the first torsion spring in the first direction provides shifting compliance in a first direction. In response to rotation of the selector in a second direction to shift to a second mode of operation, biasing of the second torsion spring in the second direction provides shifting compliance in a second direction.

In some implementations, the multi-directional compliant shifting mechanism may also include a first shift plate fixedly coupled to the selector, a second shift plate rotatably coupled to the first shift plate by a pivot pin, such that the first and second shift plates are both rotatable about the pivot pin, and an eccentric pin fixedly coupled to the second shift plate. A first end portion of the first torsion spring may be coupled to the first shift plate and a second end portion of the first torsion spring is coupled to the second shift plate. A first end portion of the second torsion spring may be coupled to the first shift plate and a second end portion of the second torsion spring is coupled to the second shift plate. The first torsion spring may be positioned between the first and second shift plates, surrounding the pivot pin. The second torsion spring may be positioned between the first and second shift plates, surrounding the first torsion spring.

The details of one or more implementations are set forth in the accompanying drawings and the description below. Other features will be apparent from the description and drawings, and from the claims.

BRIEF DESCRIPTION OF THE DRAWINGS

FIGS. 3 and 4 illustrate exemplary interfaces between a selection device and a shifting device of an exemplary parallel axis power transmission system.

FIGS. 5A-5E illustrate an exemplary compliant shifting mechanism for a multi-speed power tool, in accordance with implementations described herein.

FIGS. 7A and 7B illustrate an exemplary compliant shifting mechanism for a multi-speed power tool, in accordance with implementations described herein.

FIGS. 8A-8D illustrate an exemplary retention device for a compliant shifting mechanism of a multi-speed power tool, in accordance with implementations described herein.

DETAILED DESCRIPTION

Figure 1:
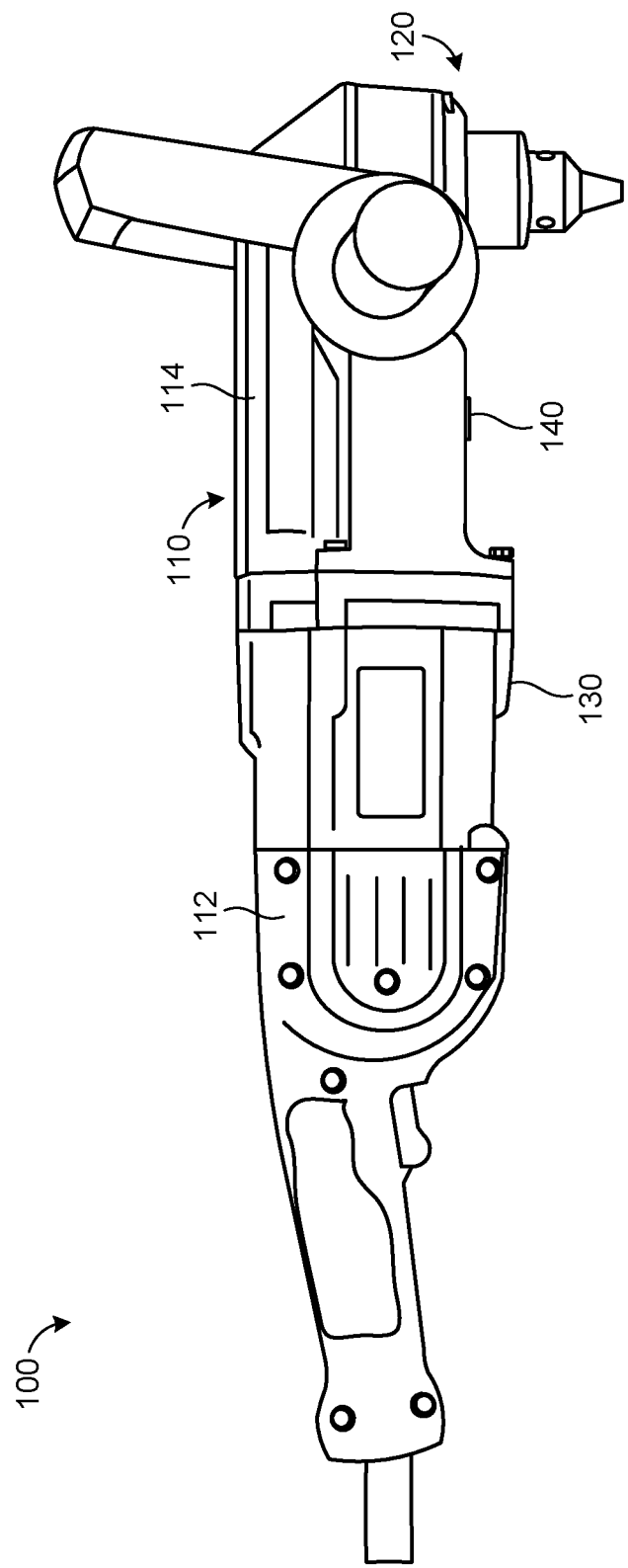
FIG. 1 illustrates an exemplary multi-speed power tool.

An exemplary power tool 100 is illustrated in FIG. 1. A plurality of different operation speeds may be selected for operation of the exemplary tool 100 shown in FIG. 1 by, for example, selective manipulation of a speed selector 140, or a shift knob 140. In some circumstances, misalignment of physical features of internal components of the tool 100 may hinder effective shifting between multiple different operational speeds of the tool 100, and/or may result in damage to one or more of the internal components. A compliant shifting mechanism, in accordance with implementations described herein, may provide multi-directional compliance when shifting between multiple different operational speeds of a multi-speed power tool. A compliant shifting mechanism, in accordance with implementations described herein, may compensate for the misalignment of physical features of internal components of the tool 100, for example, physical features of a power transmission system of the tool 100, to provide multi-directional compliance, and to facilitate shifting between multiple different operational speeds, and to reduce or substantially eliminate the likelihood of damage to internal components of the tool during shifting.

As shown in FIG. 1, the exemplary power tool 100 may include a housing 110 including, for example a motor housing 112 and a gear housing 114. A chuck assembly 120 may be provided at an end portion of the housing 110, for example, at an end portion of the housing 110 corresponding to a working end of the tool 100. A trigger 130 for triggering operation of the tool 100 may be provided at a portion of the housing 100 corresponding to a handle portion 116 of the housing 110. A speed selector 140 may provide for user selection of an operational speed of the tool 100 through user manipulation of the speed selector 140. The speed selector 140 may also be referred to as a shift knob 140, or a selector knob 140, or simply a knob 140.

The exemplary power tool 100 illustrated in FIG. 1 is a driving tool, in which an input driving direction is orthogonal to an output driving direction based on, for example, an arrangement of internal power generating, driving and transmission components in the housing 110. However, the principles to be described herein may applied to other implementations of multi-speed power tools in which a parallel axis transmission arrangement transfers a driving force from a power generation component to an output component.

Figure 2A:
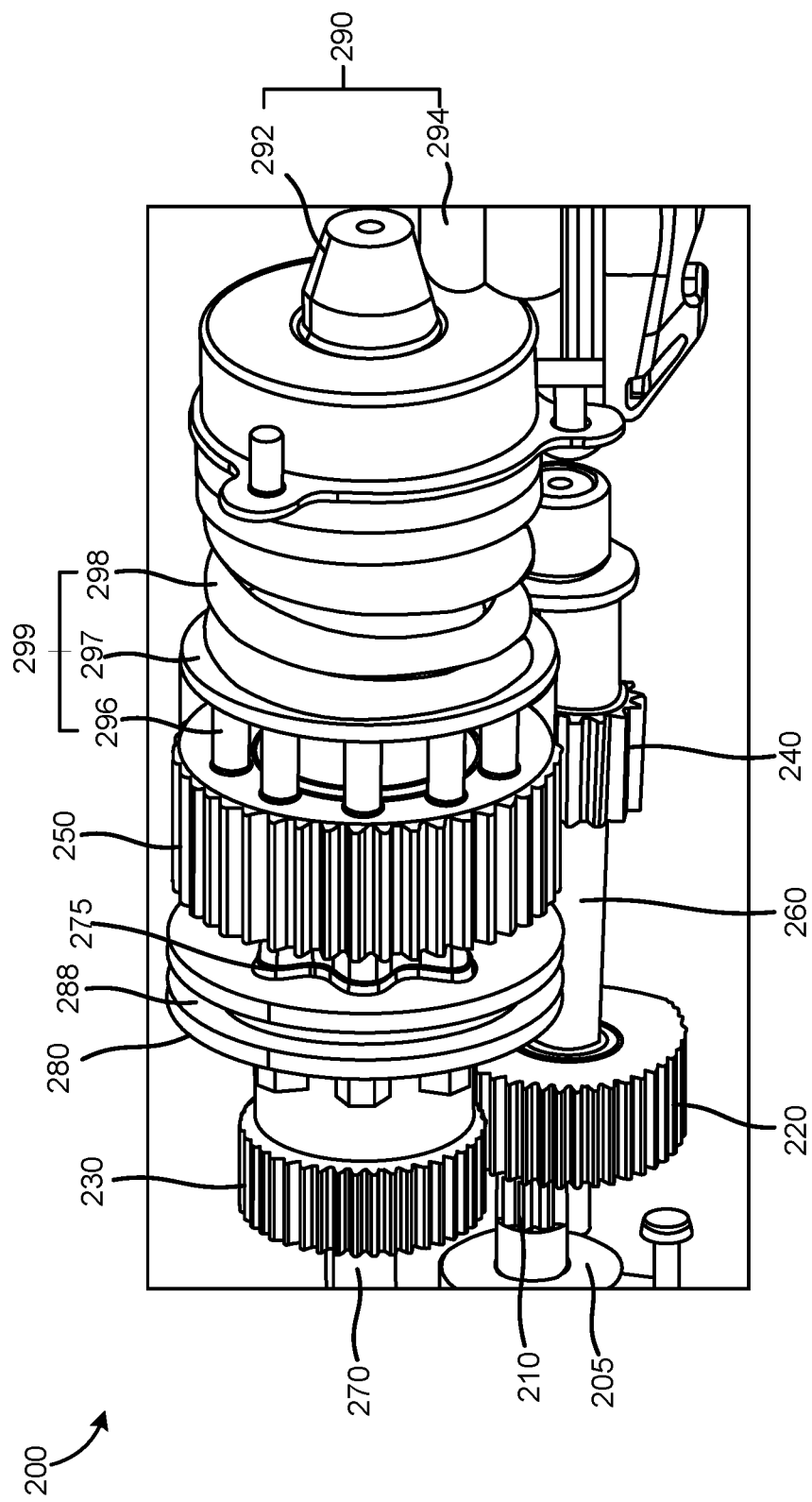
FIG. 2A is a perspective view of an exemplary parallel axis power transmission system for a multi-speed power tool.

FIG. 2A is a partial side view of an exemplary parallel axis power transmission system 200 for a power tool, such as, for example, the exemplary power tool 100 shown in FIG. 1, and FIGS. 2B-2D are a cross-sectional views of the exemplary parallel axis power transmission system 200 shown in FIG. 2A. The system 200 may include an input mechanism that receives power, for example, a rotational force, from a motor 205, for transfer to an output mechanism. The output mechanism may receive the rotational force from the input mechanism, and output the received force, at a selected operational speed, to a chuck/tool assembly 215 (for example, the chuck assembly 120 shown in FIG. 1).

Figure 2B:
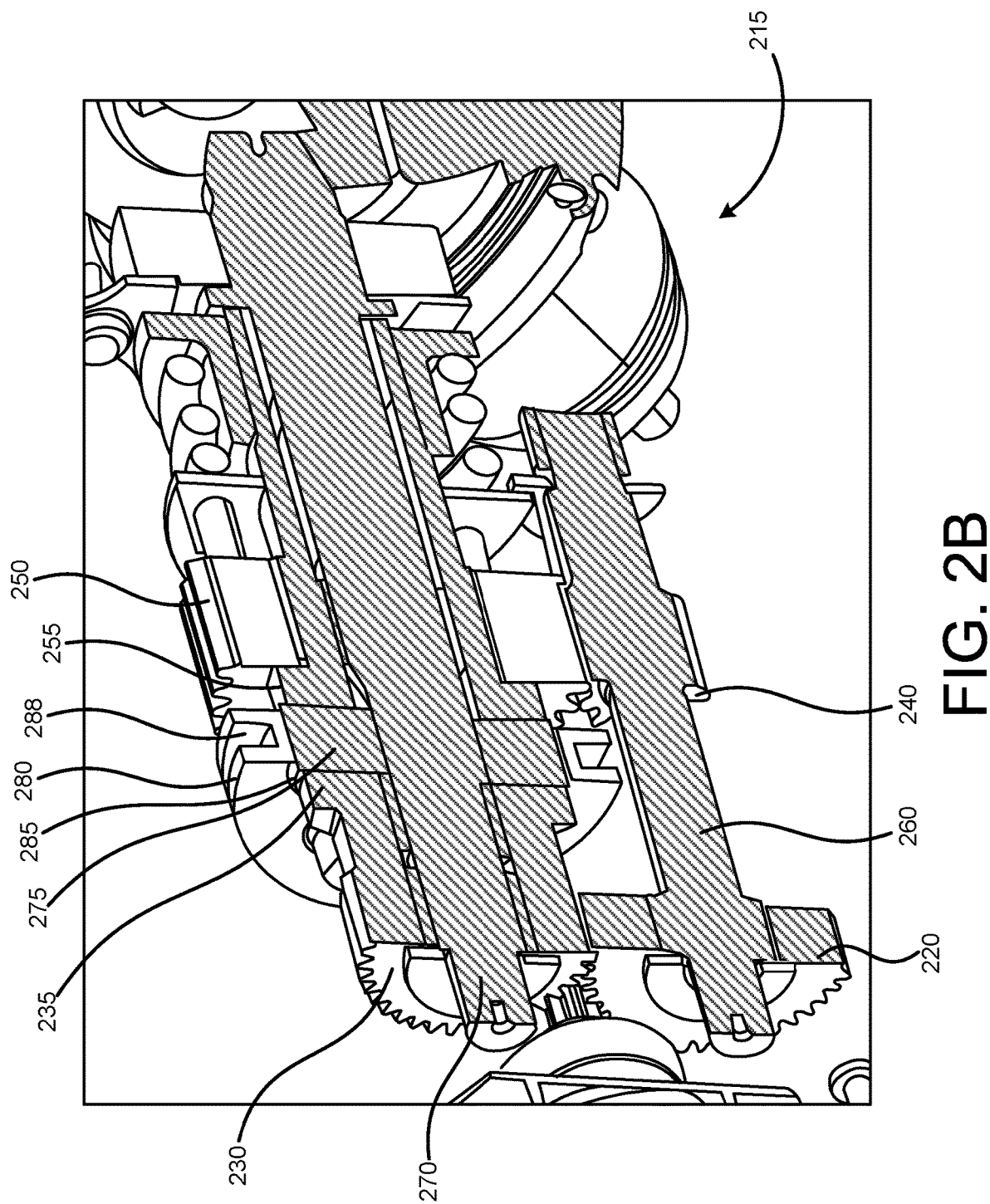
FIGS. 2B-2D are cross-sectional views of the exemplary parallel axis power transmission system shown in FIG. 2A.

As shown in the exemplary implementation illustrated in FIGS. 2A and 2B, the input mechanism may include a high speed input gear 220 and a low speed input gear 240 mounted on an input shaft 260. The output mechanism may include a high speed output gear 230 and a low speed output gear 250 mounted on an output shaft 270. The output shaft 270 may be oriented in parallel to the input shaft 260. A shifting device 280, or shift member 280, or shift ring 280, may be mounted on a splined drive hub 275 on the output shaft 270. The splined drive hub 275 may be fixed on the output shaft 270, so that the shift ring 280 is rotationally fixed relative to the output shaft 270, but axially movable relative to the output shaft 270. A clutch assembly 295, including, for example, a clutch pin assembly 296, a clutch plate 297 and a clutch spring 298, may provide for selective engagement of the input mechanism and the output mechanism. In this exemplary arrangement, a bevel gear set 290 including, for example, and input bevel gear 292 and an output bevel gear 294, may be coupled to a terminal end portion of the output shaft 270, to transfer rotational force from the output shaft 270 to the chuck/tool assembly 215.

In the exemplary implementation shown in FIGS. 2A-2D, the high speed input gear 220 is in meshed engagement with the high speed output gear 230, and the low speed input gear 240 is in meshed engagement with the low speed output gear 250, with the high speed input gear 220 and the low speed input gear 240 fixedly mounted on the input shaft 260, while the high speed output gear 230 and the low speed output gear 250 may rotate freely about the output shaft 270. In this exemplary arrangement, the input shaft 260, the high speed input gear 220 and the low speed input gear 240 rotate together in response to a rotational force transferred thereto by a motor pinion 210 driven by the motor 205. This rotation of the input mechanism (i.e., of the input shaft 260, the high speed input gear 220 and the low speed input gear 240) may be selectively transferred to the output mechanism via the meshed engagement of the high speed input gear 220/high speed output gear 230, or the meshed engagement of the low speed input gear 240/low speed output gear 250. The output mechanism may, in turn, transfer this force to the chuck/tool assembly 215 via the bevel gear 290.

User manipulation of a movable selector 300, or shift knob 300 (such as, for example, the speed selector 140 shown in FIG. 1), may actuate, or cause movement of a shifting device coupled to the selector 300, allowing the tool to operate at multiple different operating speeds. For example, manipulation of the selector 300 may adjust an axial position of the shift ring 280 relative to the output shaft 270. In the arrangement shown in FIGS. 2A and 2B, the shift ring 280 is positioned between the between the high speed output gear 230 and the low speed output gear 250, such that neither gear 230, 250 is engaged.

Figure 2C:
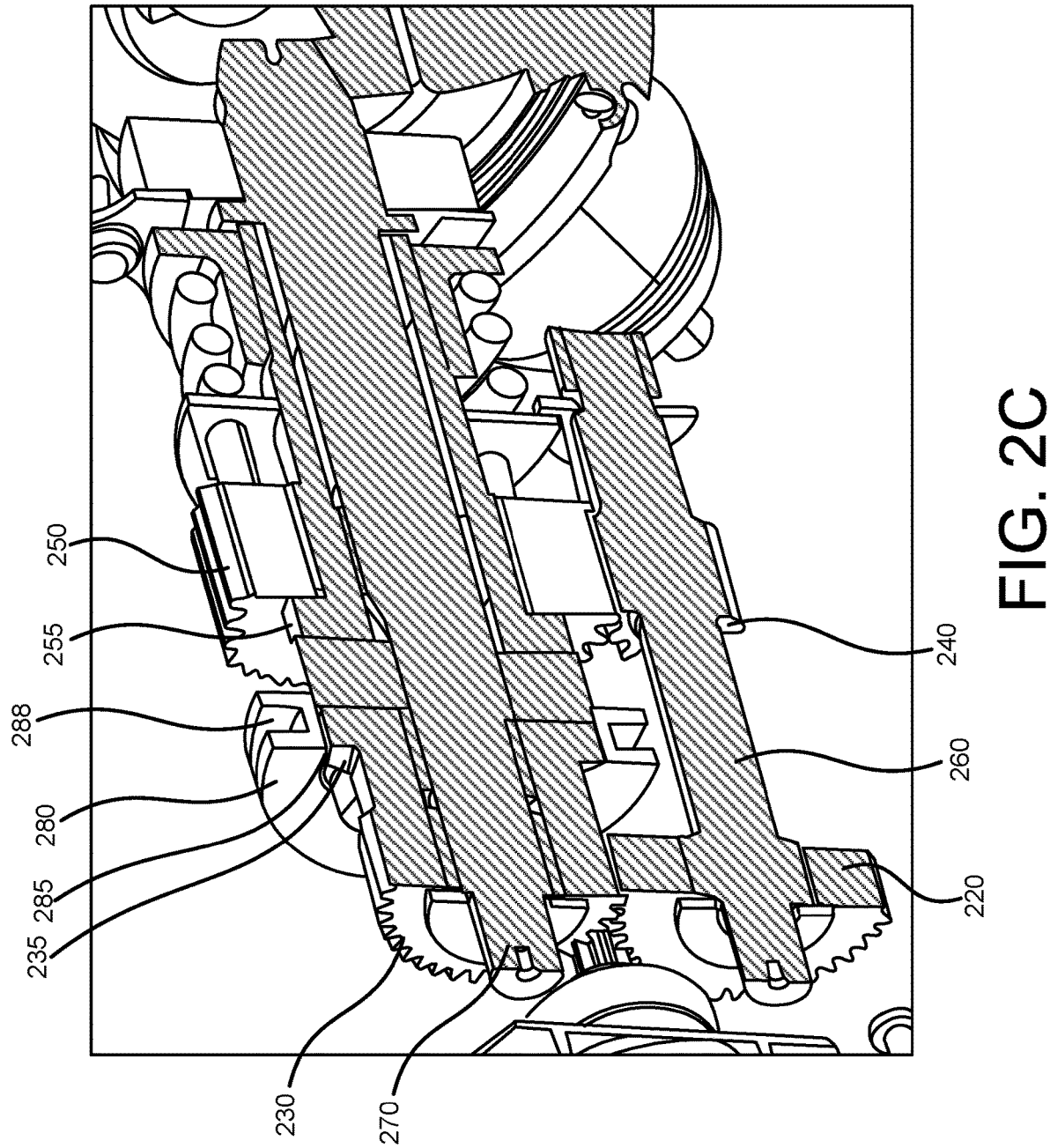

Manipulation of the selector 300 to a first setting may cause the shift ring 280 to move axially relative to the output shaft 270, to a first position, as shown in FIG. 2C. In the first position, splines 285 defined on an inner circumferential surface of the shift ring 280 may engage with splines 235 on an outer circumferential surface of a collar portion of the high speed output gear 230. In the first position, engagement of the splines 235, 285 in this manner may fix a position of the high speed output gear 230 on the output shaft 270, such that the output shaft 270 rotates, together with the high speed output gear 230, at a first speed, while the low speed output gear 250 rotates freely about the output shaft 270. The first speed at which the output shaft 270 is driven is based on an input speed at which the high speed input gear 220 is driven by the motor pinion 210, the meshed engagement of the high speed input gear 220 and the high speed output gear 230, and the relative size of the high speed input gear 220 and the high speed output gear 230.

Figure 2D:
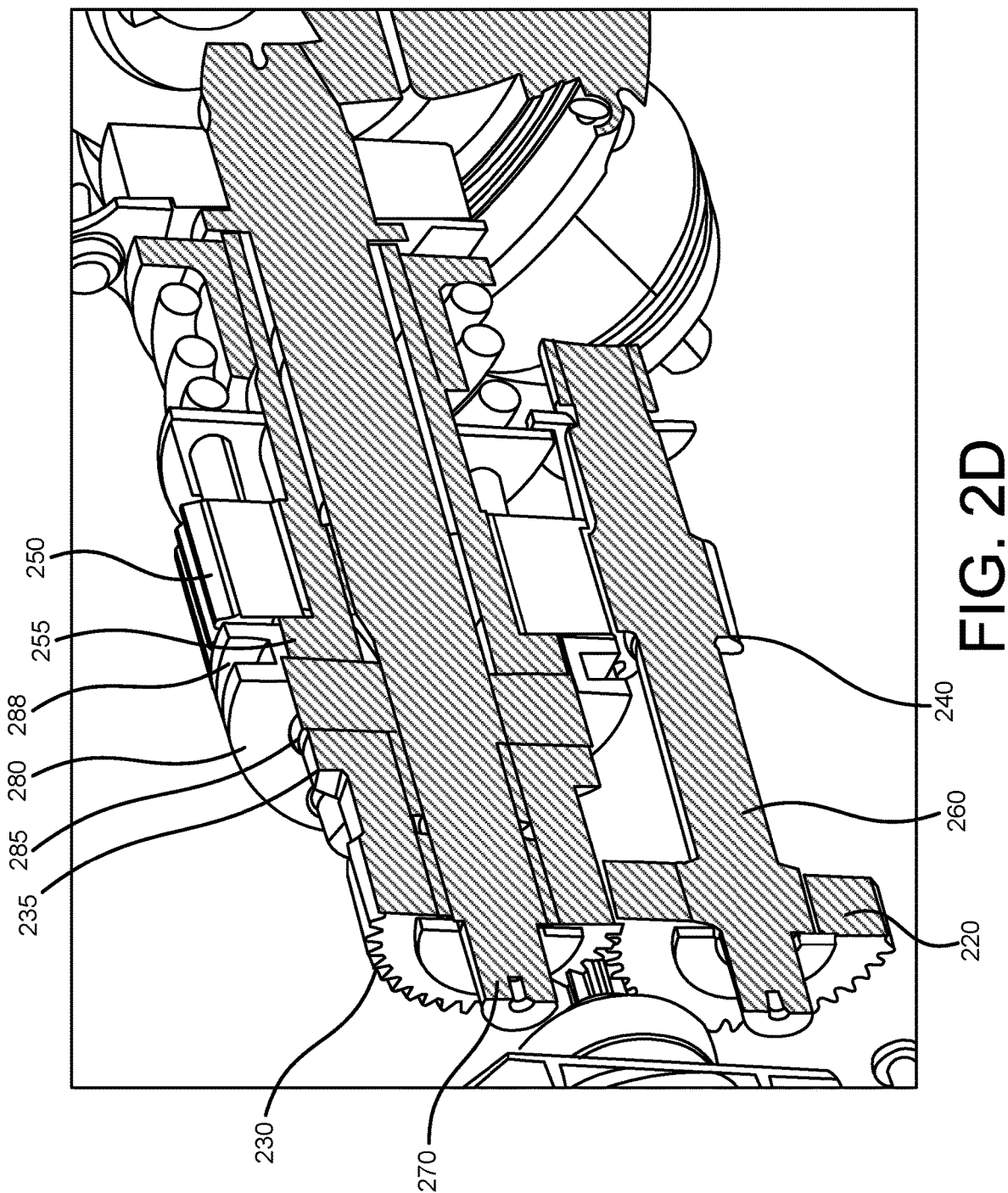

Manipulation of the selector 300 to a second setting may cause the shift ring 280 to move axially relative to the output shaft 270, to a second position, as shown in FIG. 2D. In the second position, the splines 285 defined on the inner circumferential surface of the shift ring 280 may engage with splines 255 on an outer circumferential surface of a collar portion of the low speed output gear 250. In the second position, engagement of the splines 255, 285 in this manner may fix a position of the low speed output gear 250 on the output shaft 270, such that the output shaft 270 rotates, together with the low speed output gear 250, at a second speed, while the high speed output gear 230 rotates freely about the output shaft 270. The second speed at which the output shaft 270 is driven is based on an input speed at which the low speed input gear 240 is driven by the motor pinion 210, the meshed engagement of the low speed input gear 240 and the low speed output gear 250, and the relative size of the low speed input gear 240 and the low speed output gear 250. In the arrangement of components shown in FIGS. 2A-2D, the first speed is greater than the second speed based on, for example, the relative sizing of the gears 220, 230, 240, 250.

Figure 3:
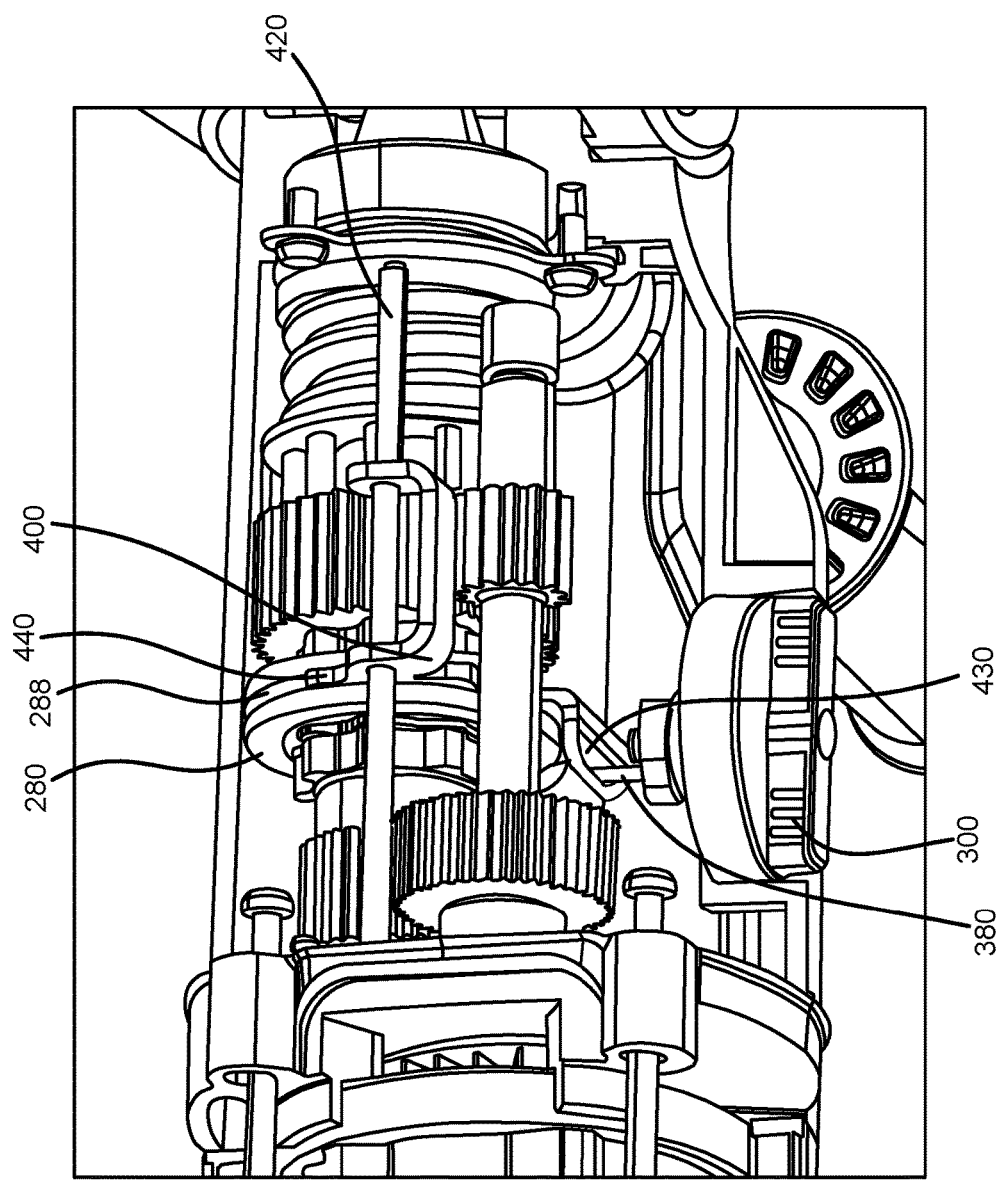

Axial movement, or shifting, of the shift ring 280 relative to the output shaft 270 may include actuation of an interface device, or shifting device, or shifting mechanism, coupled between the selector 300 and the shift ring 280. FIGS. 3 and 4 illustrate exemplary interface devices between the selector 300 and the shift ring 280 of the exemplary system shown in FIGS. 2A-2D. As shown in FIG. 3, in some implementations a shifting fork 400 may be coupled between the selector 300 and the shift ring 280. The shifting fork 400 may be movably mounted on fixed rail(s) 420 arranged in parallel to the output shaft 270. An eccentric pin 380 may extend into a slot 430 defined in a flange portion of the shifting fork 400, to engage the selector 300 and the shifting fork 400. An engagement portion 440 of the shifting fork 400 may be received in an annular groove 288 defined in the shift ring 280. As the selector 300 is manipulated, for example, turned or rotated in a first direction to shift into a high speed operation mode of the tool, the eccentric pin 380 received in the slot 430 is also moved, causing a corresponding axial movement of the shifting fork 400 engaged with the shift ring 280, and a corresponding axial movement (in a first axial direction) of the shift ring 280 to an engaged position with the high speed output gear 230 as described above. Similarly, as the selector 300 is manipulated, for example, turned or rotated to shift into a low speed operation mode of the tool, the eccentric pin 380 received in the slot 430 is also moved, causing a corresponding axial movement of the shifting fork 400 engaged with the shift ring 280, and a corresponding axial movement (in a second axial direction) of the shift ring 280 to an engaged position with the low speed output gear 250 as described above.

As shown in FIG. 4, in some implementations, the eccentric pin 380 may be received directly in the annular groove 288 defined in the shift ring 280. In this exemplary arrangement, as the selector 300 is manipulated to select high speed operation, the eccentric pin 380 received in the annular groove 288 is also moved, causing a corresponding axial movement (in the first axial direction) of the shift ring 280 to engage the high speed output gear 230 as described above. Similarly, as the selector 300 is manipulated to select low speed operation, the eccentric pin 380 received in the annular groove 288 is also moved, causing a corresponding axial movement (in the second axial direction) of the shift ring 280 to engage the low speed output gear 250 as described above.

As noted above, as the selector 300 is manipulated to select one of a plurality of operating speeds, the shift ring 280 may move axially with respect to the output shaft 270, to engage either the high speed output gear 230 or the low speed output gear 250, to set a selected operation speed and corresponding output to the chuck/tool assembly 215. In some instances, the splines 235 of the high speed output gear 230/splines 255 of the low speed output gear 250 and the splines of the drive hub 275/splines of the shift ring 288 may be rotationally misaligned (i.e., may be positioned such that they are not rotationally aligned) when the selector 300 is manipulated in this manner, restricting axial movement of the shift ring 280. A compliant shifting mechanism, in accordance with implementations described herein, may facilitate shifting between operational speeds, and may reduce or substantially eliminate the likelihood of damage to the respective splines, and/or other internal components of the tool, when initiating axial movement of the shift ring 280 when the splines are rotationally misaligned.

FIGS. 5A-5E illustrate a multi-directional compliant shifting mechanism 500, or a multi-directional compliant shifter 500, for a multi-speed power tool, in accordance with implementations described herein. A compliant shifting mechanism, or compliant shifter, in accordance with implementations described herein, may provide multi-directional compliance to compensate for potential, temporary, misalignment of physical features of a power transmission system, thus facilitating the shifting of a multi-speed power tool amongst a plurality of different operating speeds.

Figure 5B:
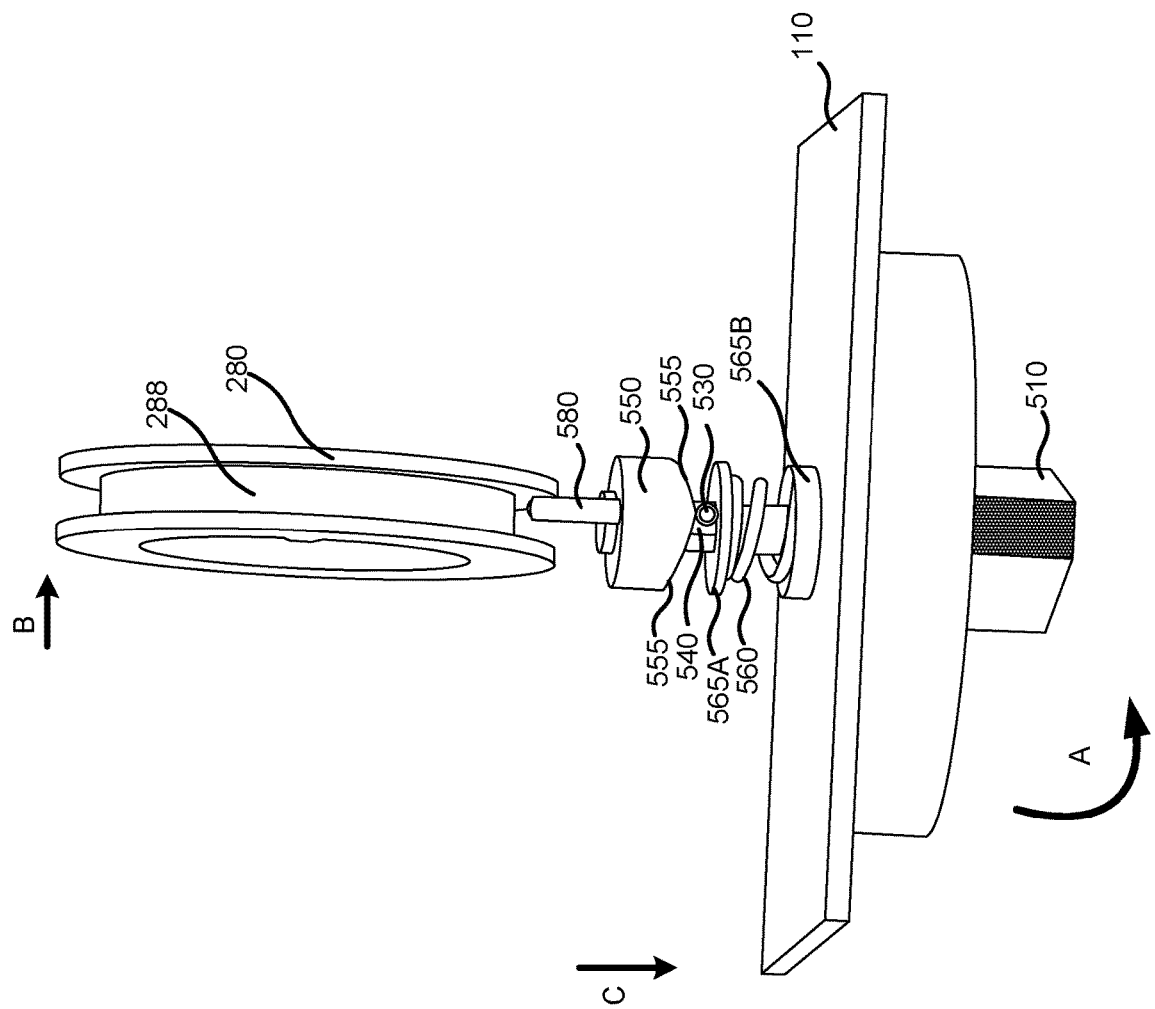

As shown in FIG. 5A, in some implementations, a knob 510 may be coupled at an outer side of the housing 110 of the tool, for manipulation by a user in selecting an operating speed of the tool. A shaft 520 may extend from the knob 510, through the housing 110 of the tool, and into an interior space defined by the housing 110. A cross-pin 530 may extend radially with respect to the shaft 520, and be movable axially with respect to the shaft 520. In the exemplary arrangement shown in FIGS. 5A-5E, the cross-pin 530 extends through an elongated axial slot 540 defined in the shaft 520. A cam body 550 may be positioned at an end portion of the shaft 520. The cam body 550 may be in an axially fixed position on the shaft 520, but may be rotatably movable about the shaft 520. The cross-pin 530 may be positioned in the slot 540 so as to abut a cam surface 555 of the cam body 550. A spring 560 may be positioned between the interior facing side of the housing 110 and the cam surface 555 of the cam body 550. The cam surface 555 may be angled, or tapered, or contoured, to provide for selective compression of the spring 560 in response to interaction between the cross-pin 530 and the cam surface 555. The interaction of the cam body 550/cam surface 555/cross-pin 530 may define a camming mechanism causing the single compression spring 560 to provide biasing in multiple directions, for example, two directions, based on the position of the pin 560 along the contoured cam surface 555. In some implementations, a first end portion of the spring 560 may abut a first plate 565A, and a second end portion of the spring 560 may abut a second plate 565B. The first plate 565A may be positioned between the first end portion of the spring 560 and the cross-pin 530, such that the biasing force exerted by the spring 560 is transmitted, via the plate 565A, to the cross-pin 530, such that the cross-pin maintains contact against the tapered, or contoured cam surface 555 of the cam body 550. The eccentric pin 580 may be fixed to a surface of the cam body 550 opposite the cam surface 555. In the exemplary compliant shifting mechanism 500 shown in FIGS. 5A-5E, the eccentric pin 580 is received in the annular groove 288 defined in the shift ring 280, simply for ease of discussion and illustration. In some implementations, the eccentric pin 580 may be coupled with the shift ring 280 by, for example, a shifting fork 400 as shown in FIG. 3.

In the position illustrated in FIG. 5A, the knob 510 (and the shift ring 280) may be in a fixed position, for example, corresponding to operation of the tool in a first mode, such as, for example, the high speed operation mode. As discussed above, the knob 510 may be manipulated to shift, or switch, from operation in the high speed mode to operation in the low speed mode. For example, the knob 510 may be rotated, to select the low speed operation mode in which the shift ring 280 engages the low speed output gear 250 (with the high speed output gear 230 rotating freely). In the position illustrated in FIG. 5B, the knob 510 has been rotated by a radial distance, for example, by approximately 180 degrees, in the direction illustrated by the arrow A (for example, counterclockwise in the exemplary orientation illustrated in FIG. 5B), to shift the tool from operation in the high speed mode shown in FIG. 5A, to operation in the low speed mode. In some implementations, the rotated position of the knob 510 may be retained by a retention device such as, for example, detents, catches and the like.

In some situations, when rotating the knob 510 to accomplish shifting into the desired operation mode, the splines of the corresponding output gear may be rotationally misaligned with the splines of the drive hub 275/splines 285 of the shift ring 280. For example, in shifting from operation in the high speed mode to operation in the low speed mode, the splines 255 of the low speed output gear 250 may be rotationally misaligned with the splines 285 of the shift ring 280/splines of the drive hub 275. This misalignment may restrict the axial movement of the shift ring 280, and may result in a binding of a position of the eccentric pin 580 relative to the shift ring 280, thus restricting effective shifting into the desired mode until the splines are brought into alignment, as shown in FIG. 5B. That is, the knob 510 may rotate approximately 180 degrees, but movement of the eccentric pin 580 may be restricted due to this misalignment.

In the example illustrated in FIG. 5B, misalignment of the splines 255 of the low speed output gear 250 with the splines 285 of the shift ring 280/splines of the drive hub 275 has restricted physical movement of the eccentric pin 580, such that the eccentric pin 580 moves, or rotates, a lesser radial distance than the knob 510, such as, for example, approximately 90 degrees, even though the knob 510 has been rotated approximately 180 degrees. This binding of the eccentric pin 580 also restricts rotation of the cam body 550 relative to the shaft 520. This partial rotation of the eccentric pin 580 (and the cam body 550) may be the result of the shift ring 280 moving off of the splines 235 of the high speed output gear 230 (and, for example, moving axially in the direction of the arrow B in the exemplary orientation shown in FIG. 5B) and disengaging the high speed output gear 230, but then encountering binding due to misalignment with the splines of the low speed output gear 250. However, this rotation of the knob 510 (and the shaft 520 fixed thereto) causes the cross-pin 530 positioned in the elongated slot 540 to travel along the cam surface 555, for example, a first portion of the cam surface 555. Due to this interaction between the cross-pin 530 and the cam surface 555, the cross-pin 530 moves down in the elongated slot 540, in the direction of the arrow C, compressing the spring 560 in the direction of the arrow C, while the eccentric pin 580 remains restricted to further movement.

In the position illustrated in FIG. 5B, power may be applied to the transmission system, i.e., force from the motor 205 may be transmitted to the input shaft 260, causing rotation of the input shaft 260 and the high speed input gear 220 and the low speed input gear 240 fixed thereto (and corresponding rotational movement of the high speed output gear 230 and the low speed output gear 250), as described in detail above. This operation of the tool and corresponding rotation of the shafts/gears, with the spring 560 in the compressed state, may allow the splines of the corresponding output gear (i.e., the splines 255 on the flange of the low speed output gear 250 for selection of the low speed operation mode) to come into alignment with the splines 285 of the shift ring 280/splines of the drive hub 275. This alignment of the splines, and biasing force of the spring 560, may allow for axial movement of the shift ring 280, for example, additional axial movement of the shift ring 280 in the direction of the arrow B in the example orientation illustrated in FIG. 5C, to engage the corresponding low speed output gear 250, and corresponding movement of the eccentric pin 580. That is, as the splines come into alignment and axial movement of the shift ring 280 is no longer physically restricted, rotation of the cam body 550 in the direction of the arrow D (for example, counterclockwise in the orientation illustrated in FIG. 5C) and corresponding movement of the eccentric pin 580 are no longer restricted, and a biasing force of the spring 560 in the direction of the arrow E, as shown in FIG. 5C, may urge the shift ring 280 into the engaged position with the low speed output gear 250.

In this example, the cross-pin 530 travels along a first portion of the cam surface 555, corresponding to rotation of the knob 510 in a first direction for shifting from a first operational speed of the tool (such as, for example, operation in the high speed mode) to a second operational speed of the tool (for example, operation in the low speed mode). Application of power to the power transmission system and alignment of the splines of the shift ring 280/splines of the drive hub 275 may allow the shift ring 280 to move axially, to engage the low speed output gear 250, as the cross-pin 530 travels along a second portion of the cam surface 555, and the cam body 550 and the eccentric pin 580 to move to the position shown in FIG. 5C, while the knob 510 remains in the same position as shown in FIG. 5B.

Figure 5C:
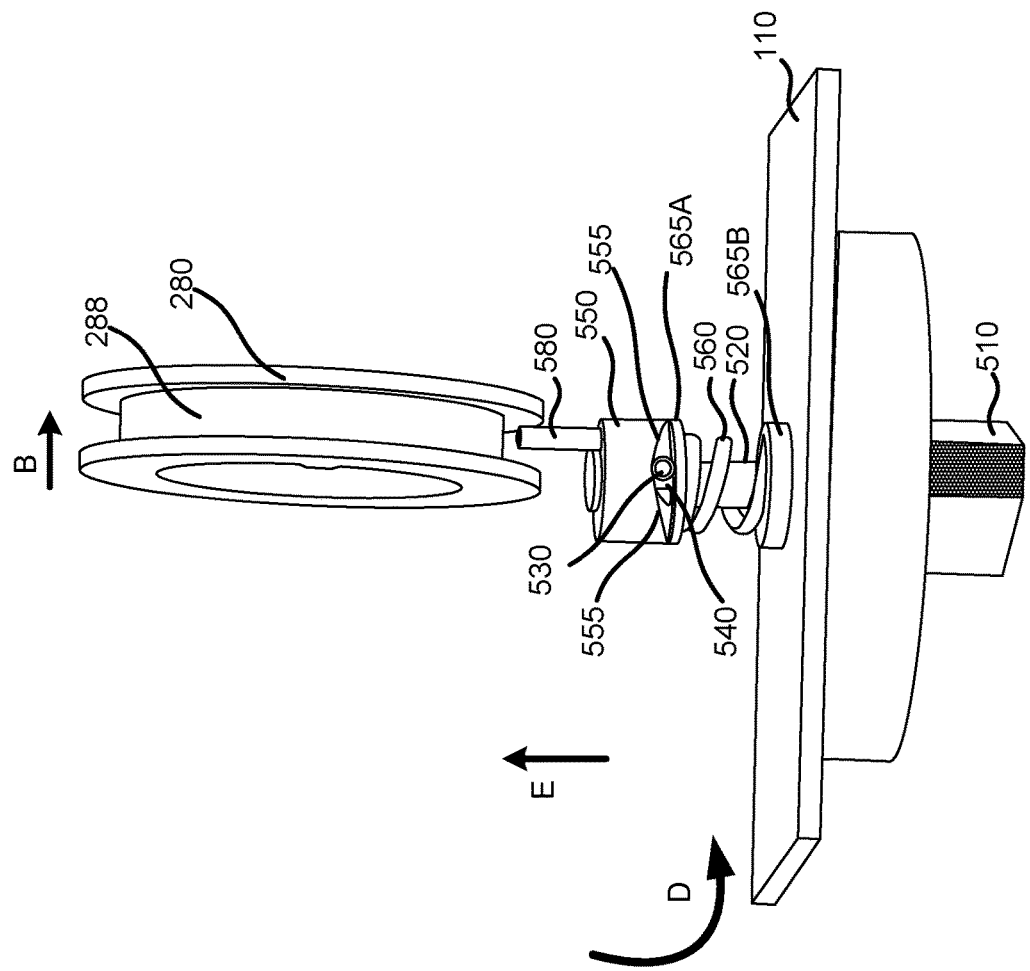

From the arrangement shown in FIG. 5C (i.e., operation of the tool in the low speed operation mode), the user may wish to shift to operation in the high speed operation mode. From the position shown in FIG. 5C, the knob 510 may be manipulated, or rotated, by a radial distance, such as, for example, approximately 180 degrees, to shift, or switch, from operation in the low speed mode to operation in the high speed mode. In the position illustrated in FIG. 5D, the knob 510 has been rotated, for example, by approximately 180 degrees, to shift the tool from operation in the low speed mode shown in FIG. 5C, to operation in the high speed mode. In some implementations, the rotated position of the knob 510 may be retained by a retention device such as, for example, detents, catches and the like.

Figure 5D:
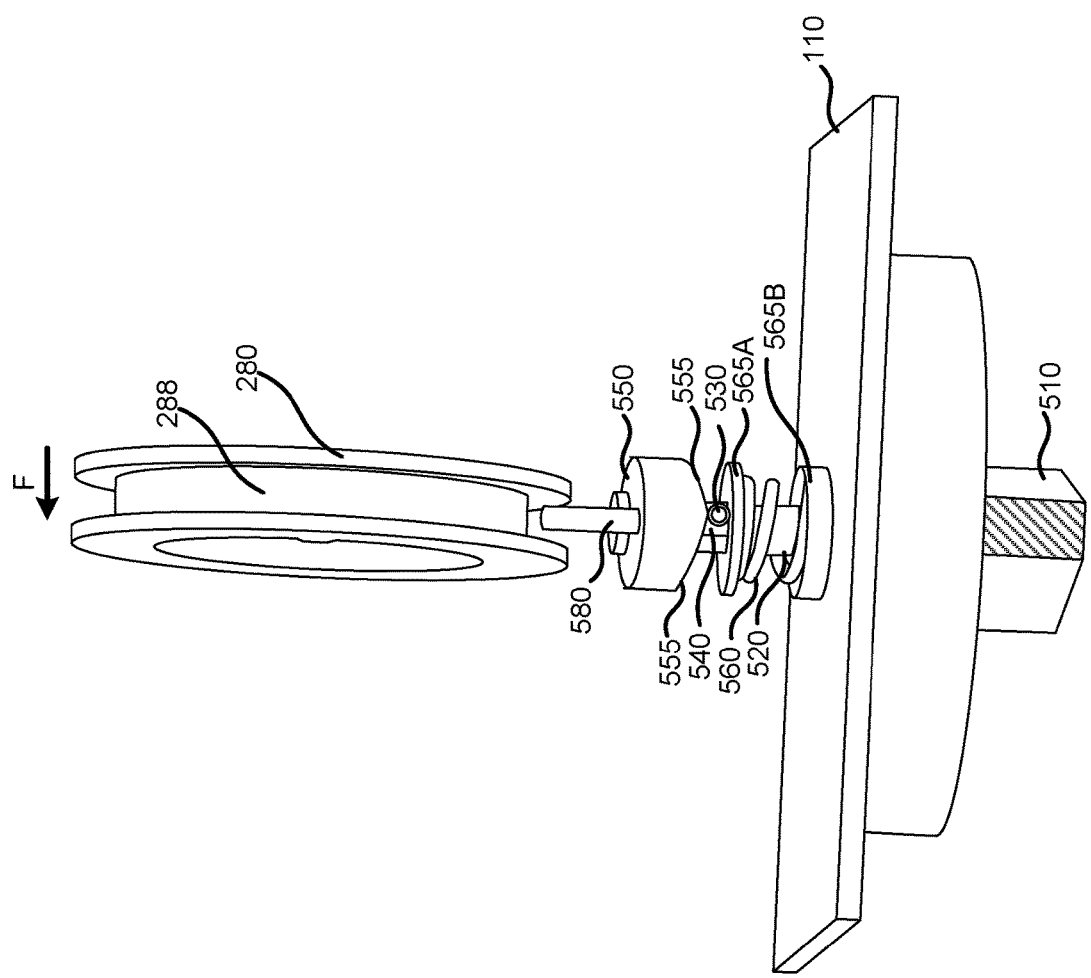

As previously described, in some situations, when rotating the knob 510 to accomplish shifting into the desired operation mode, the splines of the corresponding output gear may be rotationally misaligned with the splines 285 of the shift ring 280. For example, in shifting from operation in the low speed mode to operation in the high speed mode, the splines 235 of the high speed output gear 230 may be rotationally misaligned with the splines 285 of the shift ring 280/splines of the drive hub 275. This misalignment may restrict the axial movement of the shift ring 280, and may result in a binding of a position of the eccentric pin 580 relative to the shift ring 280, thus restricting effective shifting into the desired mode until the splines are brought into alignment, as shown in FIG. 5D. That is, the knob 510 may rotate approximately 180 degrees, but movement of the eccentric pin 580 may be restricted due to this misalignment.

In the example illustrated in FIG. 5D, misalignment of the splines 235 of the high speed output gear 230 with the splines 285 of the shift ring 280/splines of the drive hub 275 has restricted movement of the eccentric pin 580, such that the eccentric pin 580 moves, or rotates, only about 90 degrees, even though the knob 510 has been rotated by approximately 180 degrees. This partial rotation of the eccentric pin 580 (and the cam body 550) may be the result of the shift ring 280 moving off of the splines 255 of the low speed output gear 250 (and, for example, moving axially in the direction of the arrow F in the exemplary orientation shown in FIG. 5D) and disengaging the low speed output gear 250, but then encountering binding due to misalignment with the splines 235 of the high speed output gear 230. This binding of the eccentric pin 580 also restricts rotation of the cam body 550 relative to the shaft 520. However, this rotation of the knob 510 (and the shaft 520 fixed thereto) causes the cross-pin 530 positioned in the elongated slot 540 to travel along the cam surface 555. Due to this interaction between the cross-pin 530 and the cam surface 555, the cross-pin 530 moves down in the elongated slot 540, compressing the spring 560, while the eccentric pin 580 remains restricted from further movement.

Figure 5E:
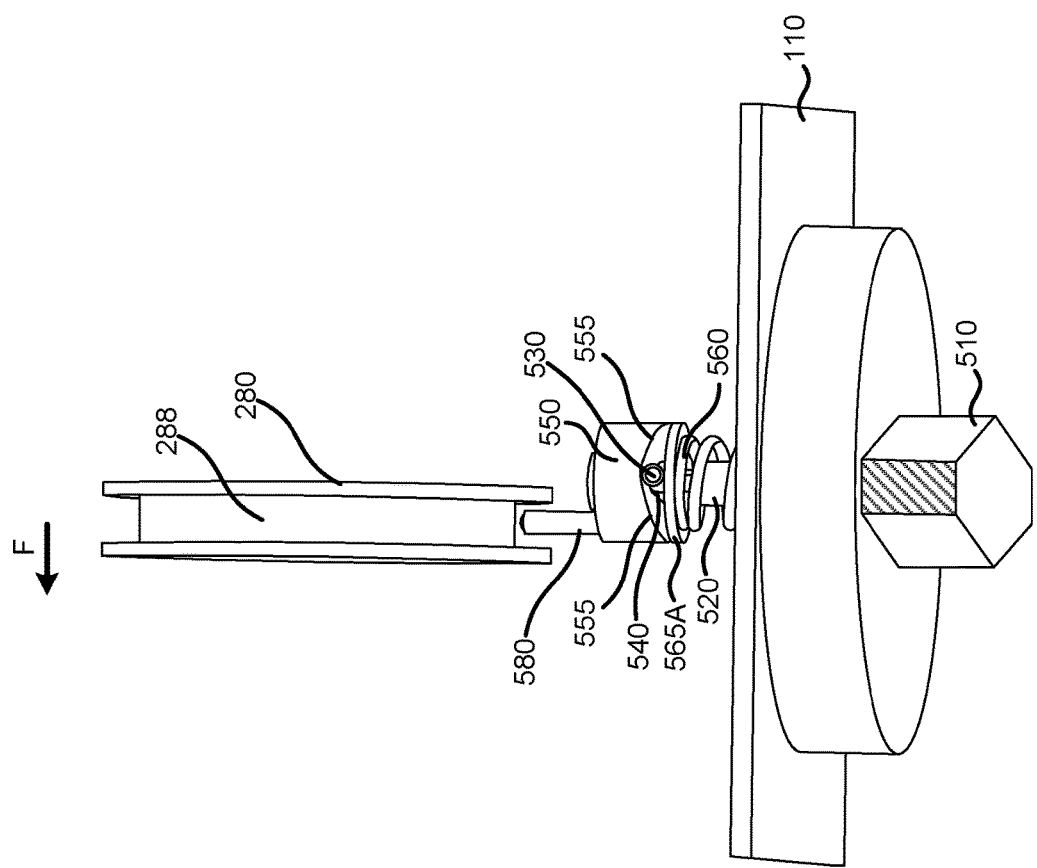

In the position illustrated in FIG. 5D, power may be applied to the transmission system, i.e., force from the motor 205 may be transmitted to the input shaft 260, causing rotation of the input shaft 260 and the high speed input gear 220 and the low speed input gear 240 fixed thereto (and corresponding rotational movement of the high speed output gear 230 and the low speed output gear 250), as described in detail above. This operation of the tool and rotation of the shafts/gears, with the spring 560 in the compressed state, may allow the splines of the corresponding output gear (i.e., the splines 235 on the flange of the high speed output gear 230 for selection of the high speed operation mode) to come into alignment with the splines 285 of the shift ring 280/splines of the drive hub 275. This alignment of the splines, and biasing force of the spring 560, may cause further axial movement of the shift ring 280 (in the direction of the arrow F in the exemplary orientation shown in FIG. 5E) to engage the high speed output gear 230, and corresponding movement of the eccentric pin 580. That is, as the splines come into alignment and axial movement of the shift ring 280 is no longer restricted, rotation of the cam body 550 and corresponding movement of the eccentric pin 580 are no longer restricted, and a biasing force of the spring 560 and corresponding movement of the eccentric pin 580 may urge the shift ring 280 to move axially in the direction of the arrow F, into the engaged position with the low speed output gear 250, as shown in FIG. 5E.

In the example shown in FIGS. 5A-5E, the cross-pin 530 travels along a first portion of the cam surface 555, corresponding to rotation of the knob 510 for shifting from a first operational speed of the tool to a second operational speed of the tool. Application of power to the power transmission system and alignment of the splines of the shift ring 280/splines of the drive hub 275 with the splines of the corresponding output gear may allow the shift ring 280 to move axially, to engage the corresponding output gear 250, as the cross-pin 530 travels along a second portion of the cam surface 555, and the eccentric pin 580 moves to the a rotated position corresponding to the rotated position of the knob 510.

Thus, in exemplary implementation shown in FIGS. 5A-5E, the interaction of the cross-pin 530 along the cam surface 555 of the cam body 550 and the selective compression of the spring 560 and release of the spring 560 based on the position of the cross-pin 530 along the cam surface 555, provides two-way biasing, or two-way compliance. In this manner, the effects of the misalignment of the splines and the binding of the eccentric pin 580, may be absorbed by the spring 560 until the splines come into alignment, allowing the user to freely rotate the knob 510 to a retained position corresponding to the selected mode of operation. Thus, effects of the binding of the internal components of the power transmission system may go essentially unnoticed by the user.

In the example shown in FIGS. 5A-5E, a compliant shifting mechanism, or compliant shifter, in accordance with implementations described herein, includes the single compression spring 560 which can withstand bi-directional compression loads determined based on, for example, operational requirements of the power transmission system of the tool. The use of a camming mechanism including the cam body 550 having a tapered, or contoured cam surface 555 (including, for example, the first tapered, or contoured portion and the second tapered, or contoured portion of the cam surface 555 as described above) that interacts with the cross-pin 530 positioned in the elongated slot 540 formed in the shaft 520, allows for the use of this single spring 560, rather than an arrangement involving multiple springs, to provide multi-directional compliance.

Figure 6A:
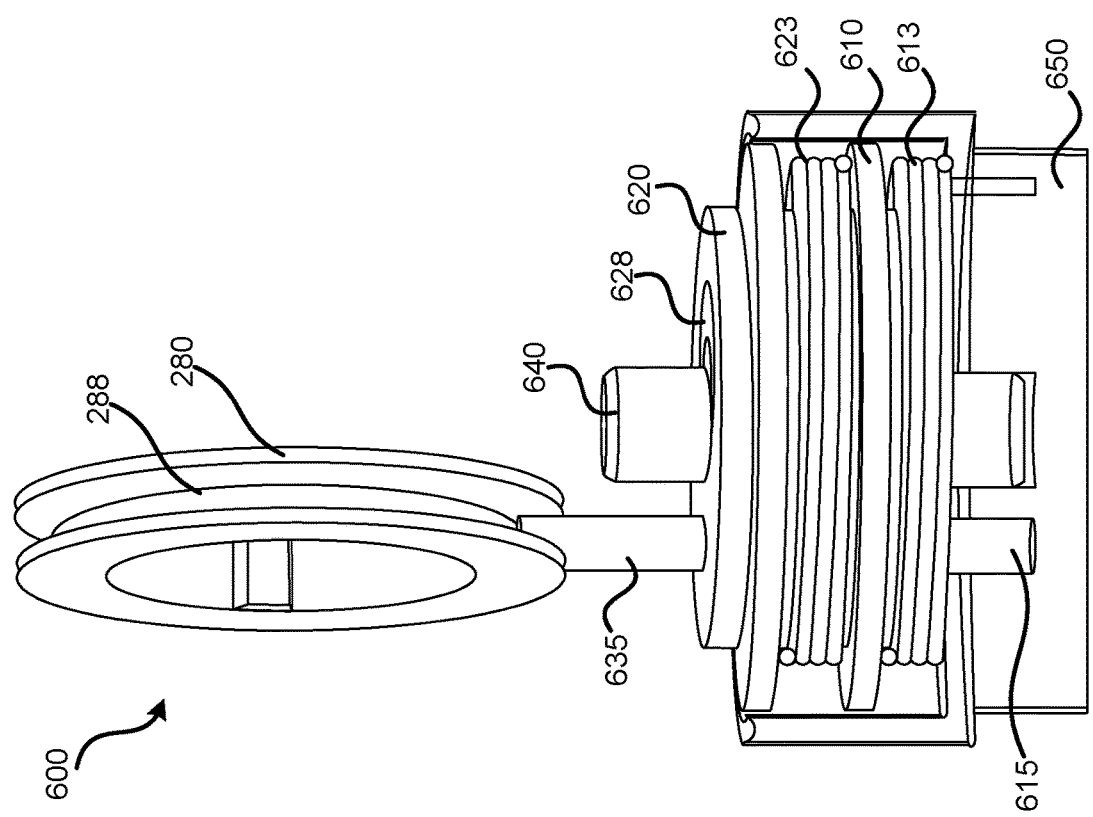
FIGS. 6A-6F illustrate an exemplary compliant shifting mechanism for a multi-speed power tool, in accordance with implementations described herein.

FIG. 6A is an assembled view, and FIGS. 6B-6F are exploded operational views, of a selector and a compliant shifting mechanism 600, or compliant shifter 600, for a multi-speed power tool, in accordance with implementations described herein, in which multiple shift plates, multiple eccentric pins, and multiple torsion springs provide multi-directional compliance in the shifting mechanism.

Figure 6B:
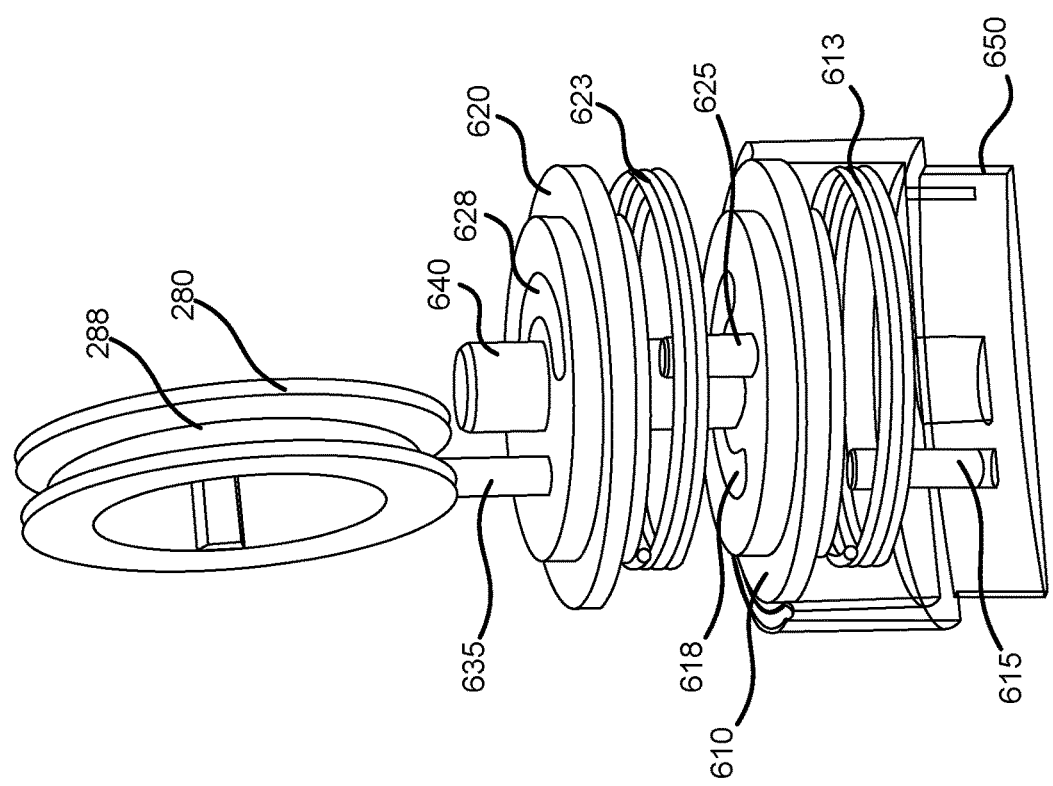

As shown in the exploded view illustrated in FIG. 6A and FIG. 6B, a first eccentric pin 615 may have a first end thereof fixed to a selector knob 650, and a second end thereof movably received in an arcuate slot 618 formed in a first shift plate 610. A second eccentric pin 625 may have a first end thereof fixed to the first shift plate 610, and a second end thereof movably received in an arcuate slot 628 formed in a second shift plate 620. In some implementations, an arc length of the arcuate slots 618, 628 formed in the first and second shift plates 610, 620, respectively, may be determined based on a degree of rotation of the knob 650 for shifting between selected operational speeds. For example, in some implementations, the arcuate slots 618, 628 formed in the first and second shift plates 610, 620, respectively, may have an arc length of approximately 180 degrees, corresponding to a degree of rotation of the knob 650 for shifting between operational speeds. A third eccentric pin 635 may have a first end thereof fixed to the second shift plate 620, and a second end thereof received in the annular groove 288 defined in the shift ring 280. In the exemplary compliant shifting mechanism 600 shown in FIGS. 6A-6F, the third eccentric pin 635 is received in the annular groove 288 defined in the shift ring 280, simply for ease of discussion and illustration. In some implementations, the third eccentric pin 635 may be coupled with the shift ring 280 by, for example, a shifting fork 400 as shown in FIG. 3. A first torsion spring 613 may have a first end thereof coupled to the selector knob 650, and a second end thereof coupled to the first shift plate 610. A second torsion spring 623 may have a first end thereof coupled to the first shift plate 610, and a second end thereof coupled to the second shift plate 620. The selector knob 650, the first shift plate 610 and the second shift plate 620 may be coupled to a shaft 640. In some implementations, the shaft 650 may be fixedly coupled to the knob 650, such that the knob 650 and the shaft 640 rotate together. The first and second shift plates 610, 620 may be rotatably coupled to the shaft 640 such that the first and second shift plate 610, 620 are rotatable relative to the shaft 640, and are rotatable relative to each other, while remaining at a fixed axial position on the shaft 640.

Figure 6C:
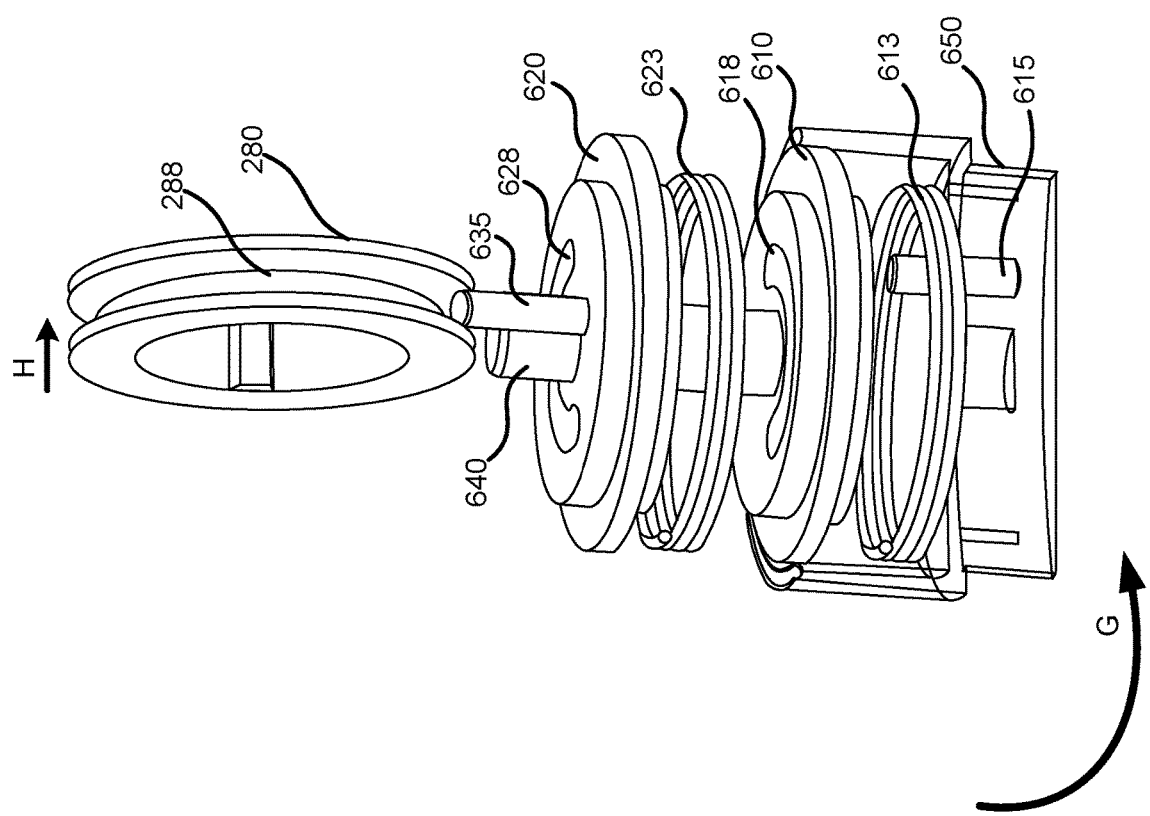

In the arrangement shown in FIG. 6B, the tool may be set for operation in a first mode of operation, for example, the high speed operation mode. From the position shown in FIG. 6B, the knob 650 may be manipulated, for example, rotated, to shift operation of the tool to a second mode of operation, for example, the low speed operation mode (in which the shift ring 280 is to engage the low speed output gear 250 with the high speed output gear 230 rotating freely). In FIG. 6C, the knob 650 has been rotated from the position shown in FIG. 6B by, for example, approximately 180 degrees in the direction illustrated by the arrow G (counterclockwise, in the perspective shown in FIG. 6C), to shift operation of the tool to the desired speed/in a desired operation mode (for example, the low speed operation mode). In some implementations, the rotated position of the knob 650 may be retained by a retention device such as, for example, detents, catches and other such retention devices.

In some situations, when rotating the knob 650 to accomplish shifting into the desired operation mode, the splines of the corresponding output gear may be rotationally misaligned with the splines 285 of the shift ring 280/splines of the drive hub 275 as described in detail above. This misalignment may restrict axial movement of the shift ring 280, and result in a binding of a position of one or more of the eccentric pins until the splines are brought into alignment. That is, in the example illustrated in FIG. 6C, by rotating the knob 650, for example, by approximately 180 degrees from the high speed operation position shown in FIG. 6B, the first shift plate 610 has also rotated by approximately 180 degrees (for example, in the direction of the arrow G, or counterclockwise in the exemplary orientation shown in FIG. 6C), and the first eccentric pin 615 and the second eccentric pin 625 have also moved in their respective arcuate slot 618, 628 by approximately 180 degrees (the position of the second eccentric pin 628 being obscured by the shaft 640 in the exemplary arrangement shown in FIG. 6C). However, due to this misalignment of the splines of the corresponding output gear with the splines 285 of the shift ring 280/splines of the drive hub 275, axial movement of the shift ring 280 is restricted, and the rotation of the second shift plate 620 and the third eccentric pin 635 is restricted, due to the restricted axial movement of the shift ring 280, even though the knob 650 has been rotated by approximately 180 degrees. In some situations, the second shift plate 620 and third eccentric pin 635 may partially rotate, for example, by approximately 90 degrees in the direction of the arrow G, as the shift ring 280 moves off of the splines 235 of the high speed output gear 230 disengages the high speed output gear 230, allowing for some partial axial movement of the shift ring 280 (for example, in the direction of the arrow H in the orientation shown in FIG. 6C) until encountering binding due to misalignment with the splines 235 of the high speed output gear 230. At the point illustrated in FIG. 6C, the first spring 613 remains in a neutral state, or an un-actuated state, while the second torsion spring 623 is in torsion, or in an actuated state, absorbing the torsion force generated due to the bound second shift plate 620 and third eccentric pin 635 relative to the rotated knob 650 and first shift plate 610.

Figure 6D:
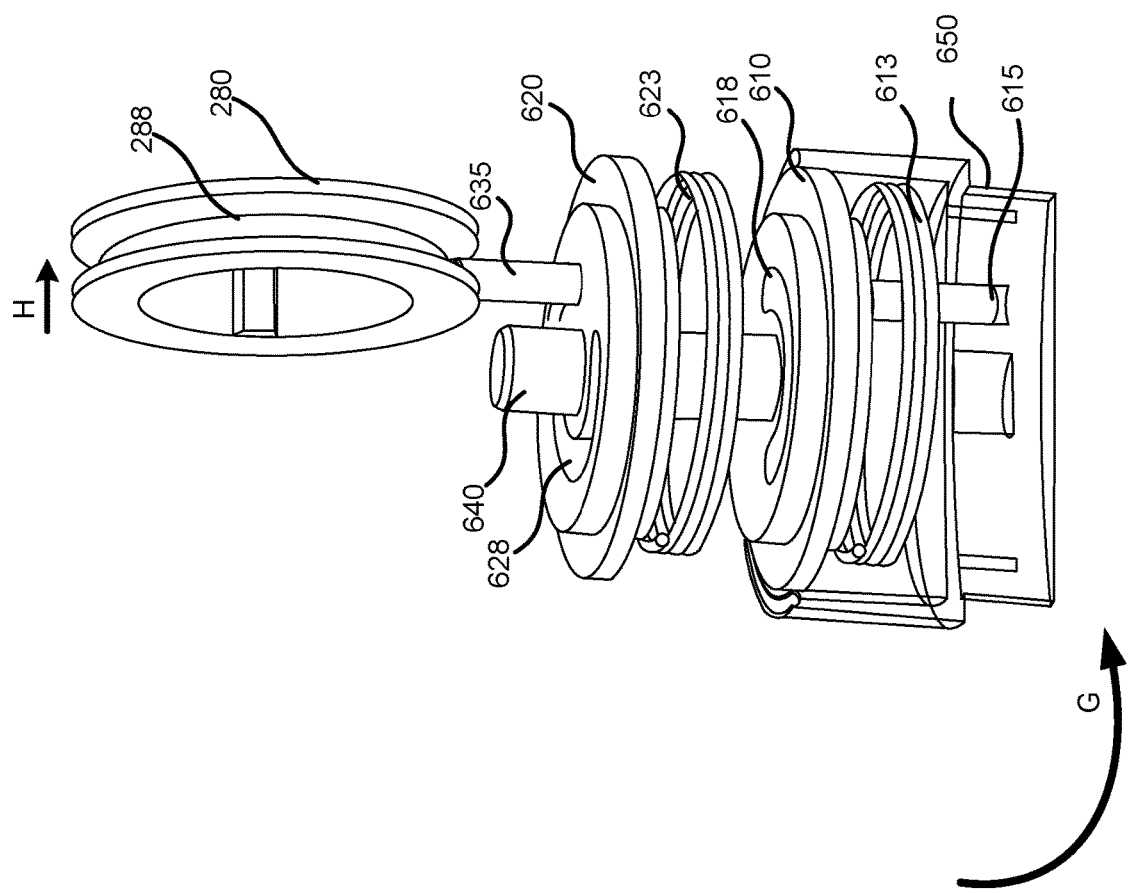

Operation of the tool, causing rotation of the input shaft 260/high speed input gear 220/low speed input gear 240 (and corresponding rotational movement of the high speed output gear 230/low speed output gear 250), with the second torsion spring 623 in the actuated state, may allow the splines of the corresponding output gear, for example, the low speed output gear 250, to come into alignment with the splines 285 of the shift ring 280/splines of the drive hub 275. This alignment of the splines may allow for further axial movement of the shift ring 280, for example, in the direction of the arrow H in the exemplary orientation shown in FIG. 6D, to engage the low speed output gear 250. The axial movement of the shift ring 280 may allow the second shift plate 620 to rotate, for example, in the direction of the arrow G in the exemplary orientation shown in FIG. 6D, and the torsion to be released from the second tension spring 623, as shown in FIG. 6D. That is, as the splines come into alignment and axial movement of the shift ring 280 is no longer restricted and the shift ring 280 moves axially, in the direction of the arrow H, relative to the output shaft 270, the second shift plate 620 may rotate further, for example, in the direction of the arrow G, by another approximately 90 degrees, thus releasing the force held by the second torsion spring 623. FIG. 6D illustrates the components of the compliant shifting mechanism, with the tool set for operation in the low speed operation mode. In this position, the knob 650, the first plate 610 and the second plate 620 are in corresponding rotational positions, and the first and second torsion springs 613, 623 are both in the neutral, or unactuated states.

Figure 6E:
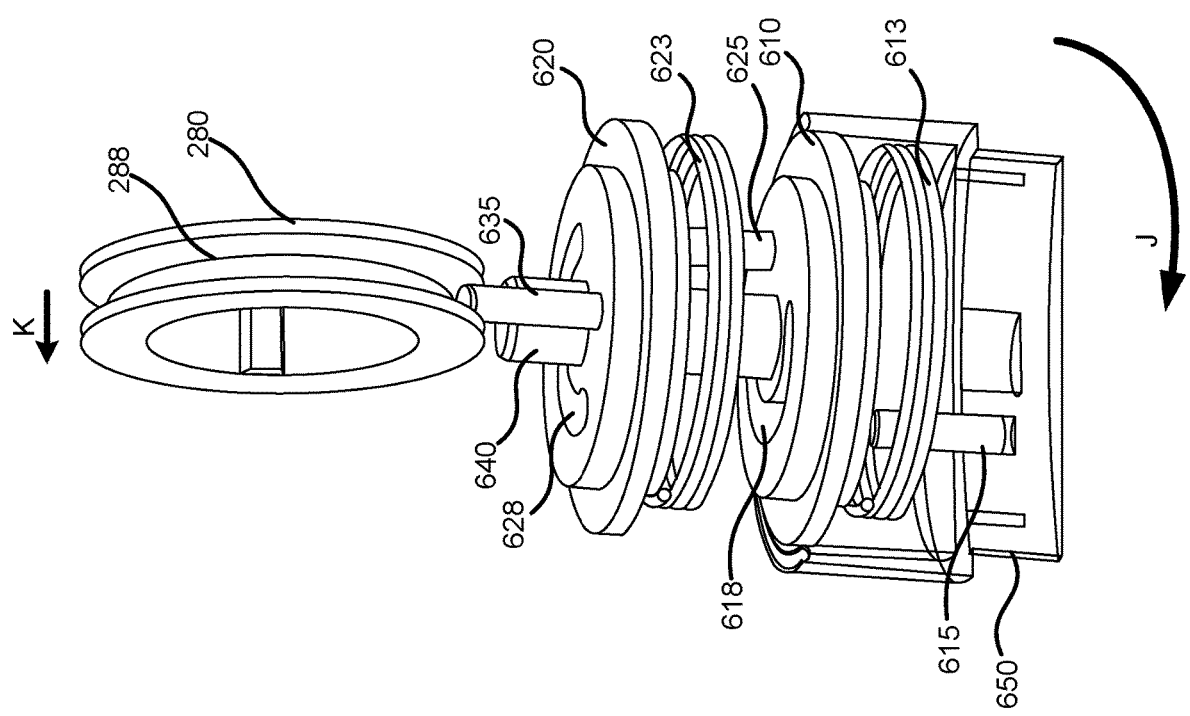

To shift from the low operation mode shown in FIG. 6D to the high speed operation mode, the knob 650 may be rotated, for example, by approximately 180 degrees from the position shown in FIG. 6D, in the direction of the arrow J, i.e., clockwise in the exemplary orientation illustrated in FIG. 6E. In this example, due to misalignment of the splines of the corresponding output gear with the splines 285 of the shift ring 280/splines of the drive hub 275, axial movement of the shift ring 280 may be restricted, and this 180 degree rotation of the knob 650 may cause a partial rotation of the first shift plate 610 and a partial rotation of the second shift plate 620, by, for example, approximately 90 degrees, in the direction of the arrow G in the exemplary orientation shown in FIG. 6D. This partial rotation of the first and second shift plates 610, 620 (as the shift ring 280 moves off of the splines 255 of the low speed output gear 250 and disengages the low speed output gear 250, but then encounters binding due to misalignment with the splines 235 of the high speed output gear 230) may allow for partial axial movement of the shift ring 280, in the direction of the arrow K in the exemplary orientation shown in FIG. 6E. In this arrangement, the first torsion spring 613 is in torsion, or in the actuated state, absorbing the torsion force generated due to the bound third eccentric pin 635 and the rotated knob 650, and the second torsion spring 623 is in a neutral state, or in the unactuated state.

Figure 6F:
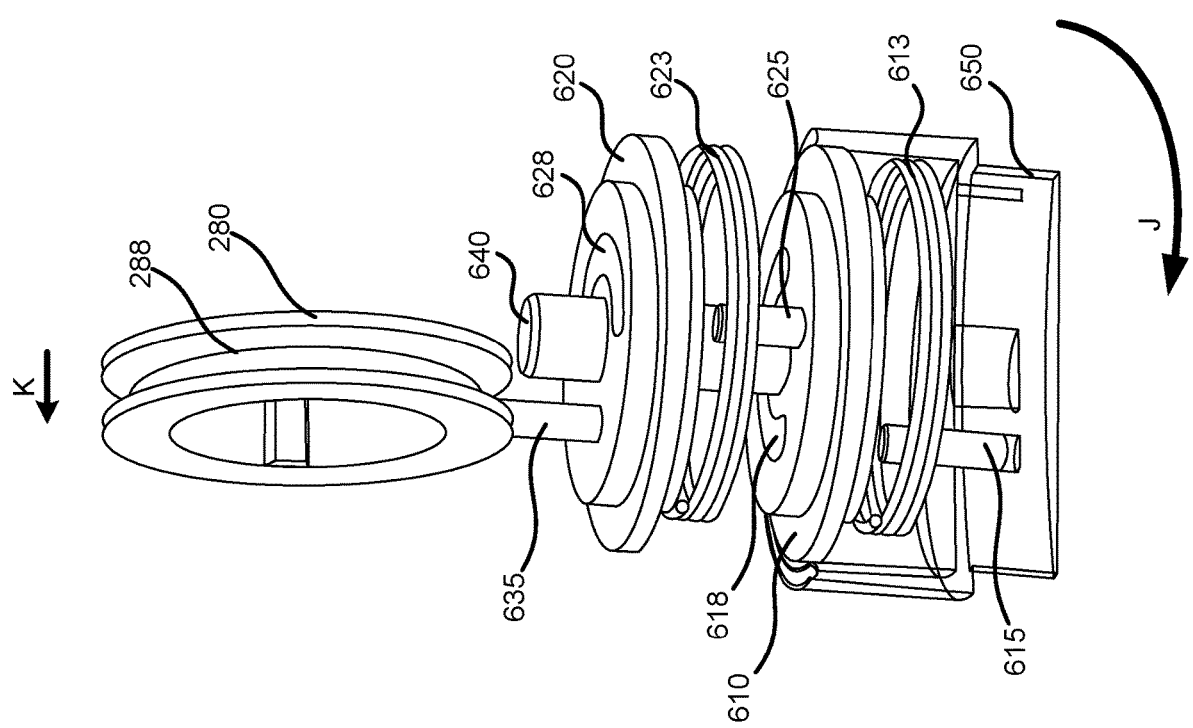

Operation of the tool (i.e., rotation of the input shaft 260 and gears 220, 240 and corresponding rotational movement of the output gears 230, 250 in response to a force transmitted from the motor 205), with the first torsion spring 613 in the actuated state, may allow the splines of the corresponding output gear to come into alignment with the splines 285 of the shift ring 280/splines of the drive hub 275. Alignment of the splines may allow for further axial movement of the shift ring 280, for example, in the direction of the arrow K in the exemplary orientation shown in FIG. 6F, to engage the corresponding output gear, causing the first shift plate 610 and the second shift plate 620 to each rotate (for example, another 90 degrees in the direction of the arrow J in the exemplary orientation shown in FIG. 6F), and the torsional force to be released from the first tension spring 613, as shown in FIG. 6F. That is, as the splines come into alignment and axial movement of the shift ring 280 is no longer restricted, allowing axial movement of the shift ring 280 (in the direction of the arrow K) relative to the output shaft 270, rotation of the first and second shift plates 610, 620 (in the direction of the arrow J) and release of the torsion force held by the first torsion spring 613 cause the shift ring 280 to move into engagement with the high speed output gear 230, shifting the tool into the high speed operation mode, as shown in FIG. 6F.

In the exemplary implementation shown in FIGS. 6A-6F, the interaction of the first and second shift plates 610, 620, the first and second torsion springs 613, 623, and the first, second and third eccentric pins 615, 625, 635 as described above provides two-way biasing, or two-way compliance in shifting between operation in the high speed operation mode and the low speed operation mode. In this manner, the effects of the misalignment of the splines and the binding of the eccentric pin(s), may be absorbed by one of the torsion springs 613, 623, allowing the user to freely rotate the selector knob 650 to a retained position corresponding to the selected mode of operation. Thus, effects of the binding of the internal components of the power transmission system may go essentially unnoticed by the user.

FIG. 7A is a perspective view, and FIG. 7B is a cross-sectional view, of a selector and a compliant shifting mechanism 700, or compliant shifter 700, for a multi-speed power tool, in accordance with implementations described herein, in which multiple shift plates, and multiple nested torsion springs provide multi-directional compliance in the shifting mechanism.

As shown in FIGS. 7A and 7B, a first shift plate 710 and a second shift plate 720 may be coupled by a pivot pin 740 such that the first and second shift plates 710, 720 are rotatable about the pivot pin 740, and such that the first and second shift plates 710, 720 are rotatable relative to each other. Connector pins 755 extend from the first shift plate 710 through the housing 110 of the tool, to be coupled to a knob 750 on at an exterior of the housing 110. A first torsion spring 713, or inner torsion spring 713, may have a first end thereof coupled to the first shift plate 710, and a second end thereof movably received in a slot 713A defined in the second shift plate 720. A second torsion spring 723, or outer torsion spring 723, may be positioned around, or surrounding, the first torsion spring 713. The second torsion spring 723 may have a first end thereof coupled to the first shift plate 710, and a second end thereof in a slot 723A defined in the second shift plate 720. An eccentric pin 715 may be fixed to the second shift plate 720.

The knob 750 may be manipulated, for example, rotated to select a first operation mode (for example, a high speed operation mode in which the shift ring 280 is to move axially in a first direction along the output shaft 270 to engage the high speed output gear 230), or a second operation mode (for example, a low speed operation mode in which the shift ring 280 is to move axially in a second direction along the output shaft 270 to engage the low speed output gear 230). In some implementations, the rotated position of the knob 750 may be retained by a retention device such as, for example, detents, catches and the like. As noted above, in some situations, the splines of the corresponding output gear may be rotationally misaligned with the splines 285 of the shift ring 280/splines of the drive hub 275, thus binding, or restricting movement of the eccentric pin 715, engaged with the shift ring 280, when the knob 750 is rotated.

In the example arrangement illustrated in FIGS. 7A and 7B, in response to rotation of the knob 750 in a first direction, the first shift plate 710 may rotate, for example, 180 degrees, while movement, or rotation, of the second shift plate 720 is restricted (due to the restricted movement, or binding, of the eccentric pin 715 with the shift ring 280). This rotation of the first shift plate 710 in the first direction, while rotation of the second shift plate 720 is restricted, may actuate the first torsion spring 713, or put the first torsion spring in torsion, while the second torsion spring 723 remains in a neutral, or an unactuated state. With the first torsion spring 713 in the actuated state, or in torsion, absorbing the torsion force generated due to the bound eccentric pin 715 and the rotated knob 750/first shift plate 710, operation of the tool and rotation of the input shaft 260 (and the input gears 220, 240 fixed thereto and corresponding rotational movement of the output gears 230, 250) may bring the splines into alignment as described above. This alignment of the splines may allow for axial movement of the shift ring 280 to engage the corresponding output gear. The axial movement of the shift ring 280 allows for movement of the eccentric pin 715, and rotation of the second shift plate 720. Rotation of the second shift plate 720 may release the torsion force on the first torsion spring 713.

Similarly, in response to rotation of the knob 750 in a second direction, the second shift plate 720 may rotate, while movement, or rotation, of the first shift plate 710 is restricted (due to the restricted movement, or binding, of the eccentric pin 715 with the shift ring 280). This rotation of the second shift plate 720 in the second direction, while rotation of the first shift plate 710 is restricted, may actuate the second torsion spring 723, while the first torsion spring 713 remains in a neutral, or an unactuated state. With the second torsion spring 723 in the actuated state, or in torsion, absorbing the torsion force generated due to the bound eccentric pin 715 and the rotated knob 750/second shift plate 720, operation of the tool and rotation of the input shaft 260 (and the input gears 220, 240 fixed thereto and corresponding rotational movement of the output gears 230, 250) may bring the splines into alignment as described above. This alignment of the splines may allow for axial movement of the shift ring 280 to engage the corresponding output gear. The axial movement of the shift ring 280 allows for movement of the eccentric pin 715, and rotation of the first shift plate 710. Rotation of the first shift plate 710 may release the torsion force on the second torsion spring 723.

In the exemplary implementation shown in FIGS. 7A-7B, the interaction of the first and second shift plates 710, 720, the first and second torsion springs 713, 723, and the eccentric pin 715 as described above provides two-way biasing, or two-way compliance. In this manner, the effects of the misalignment of the splines and the binding of the eccentric pin may be absorbed by at least one of the torsion springs 713, 723 until the splines come into alignment, allowing the user to freely rotate the selector knob 750 to a retained position corresponding to the selected mode of operation. Thus, effects of the binding of the internal components of the power transmission system may go essentially unnoticed by the user.

As previously noted, in each of the exemplary implementations described above, the rotated position of the knob may be retained relative to the housing by a retention device. Retention of the rotated position of the knob at the selected, rotated position, may support the biasing force exerted by the spring, or springs, in providing the multi-directional compliance. In absence of this type of retention of the rotated position of the knob, and the corresponding positive physical support for the biasing force of the spring(s), the knob would otherwise simply return to the previous, un-rotated position upon release of the knob by the user, without loading the selected input/output gears, and without shifting to the desired mode of operation.

An exemplary retention device for a compliant shifting mechanism, or compliant shifter, in accordance with implementations described herein, is shown in FIGS. 8A-8D.

Figure 8A:
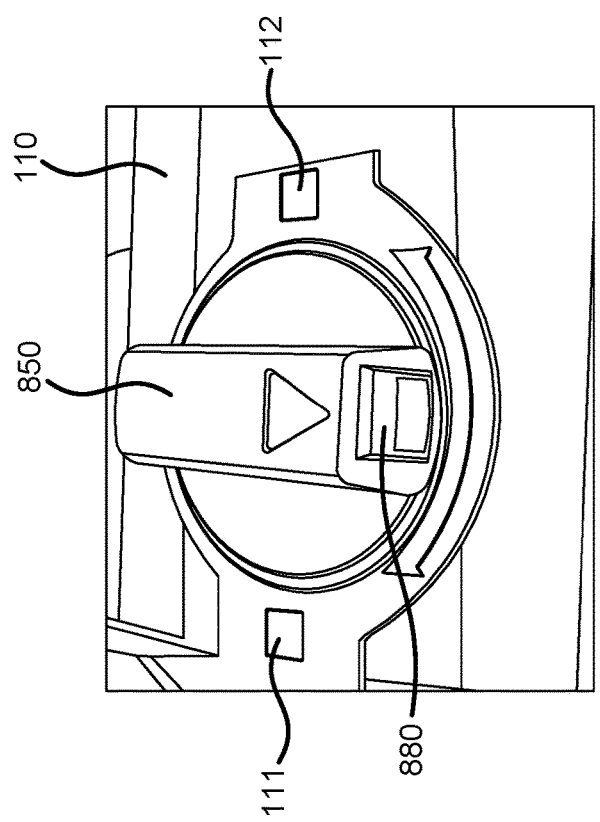
Figure 8B:
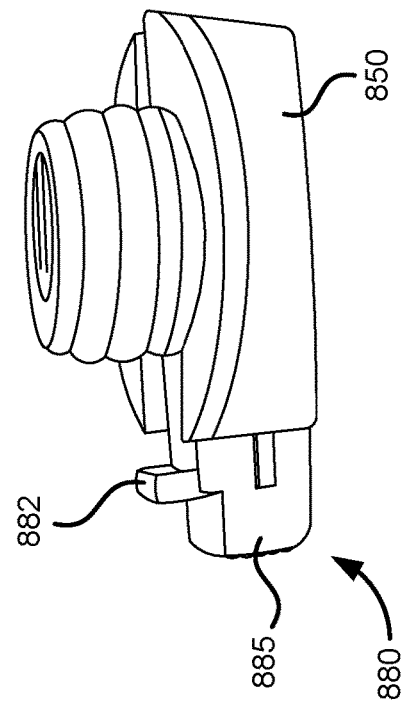

As shown in FIG. 8A, a selector knob 850 may be rotatably coupled to the housing 110 of the multi-speed power tool 100. The knob 850 may be rotatable between a first position, corresponding to a first indicator 111 for selection of a first mode of operation/operation of the tool at a first speed, and a second position, corresponding to a second indicator 112 for selection of a second mode of operation/operation of the tool at a second speed. As shown in FIGS. 8B and 8C, a retention device 880 may be installed in the knob 850. The retention device 880 may include a spring-loaded retention button 885, having a retention flange 882 at a distal end thereof that extends radially out of the knob 850, and a compression spring 884 at a proximal end thereof that is received within a channel 852 in the knob 850. The retention flange 882 may be movably received in a track 870 defined in the housing 110, as shown in FIG. 8D. The track 870 may include a first locking recess 871, corresponding to the rotated position of the knob 850 for selection of the first operation mode (and the first indicator 111), and a second locking recess 872, corresponding to the rotated position of the knob 850 for selection of the second operation mode (and the second indicator 112). To change the operation speed of the tool 100, the user may depress the distal end portion of the retention button 885 (i.e., the flange end 882 of the retention button 885) to release the locking button 850 form the current locking recess 871 or 872, and then rotate the knob 850 and release the locking button 850 for retention in the desired locking recess 871 or 872.

The exemplary retention device 880 shown in FIGS. 8A-8D is just one example of a retention device which may be employed in conjunction with a compliant shifting mechanism, in accordance with implementations as described herein.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A multi-directional compliant shifting mechanism for a multi-speed power tool, comprising:
 a movable selector;
 a shaft having a first end portion thereof fixedly coupled to the selector;
 a camming mechanism provided at a second end portion of the shaft, the camming mechanism including a cam body with a contoured cam surface axially fixed and rotatable relative to the shaft and a cam follower rotatably fixed and axially moveable relative to the shaft, the cam follower selectively moveable along the cam surface;
 an eccentric pin fixedly coupled to a first end portion of the camming mechanism and configured to cause a transmission of the power tool to shift between at least a first speed and a second speed; and
 a single compression spring positioned between a second end portion of the camming mechanism and the selector, wherein
 in response to movement of the selector to a first position, interaction of the camming mechanism with the single compression spring biases the camming mechanism to provide shifting compliance in a first direction, and
 in response to movement of the selector to a second position, interaction of the camming mechanism with the single compression spring biases the camming mechanism to provide shifting compliance in a second direction opposite the first direction.

2. The multi-directional compliant shifting mechanism of claim 1, wherein the cam follower comprises a cross-pin that extends radially through an elongated axial slot defined in the shaft.

3. The multi-directional compliant shifting mechanism of claim 1, wherein the movement of the selector to the first position comprises a movement of the selector from the second position to the first position, and, in response to the movement of the selector to the first position:
 the selector and the shaft are rotated by a first radial distance,
 rotation of the cam body and the eccentric pin are physically restricted such that the cam body and the eccentric pin are rotated by a second radial distance that is less than the first radial distance, and
 the cam follower moves along a first portion of the contoured cam surface of the cam body, and moves in a first axial direction relative to the shaft so as to compress the compression spring.

4. The multi-directional compliant shifting mechanism of claim 3, wherein, in response to removal of the physical restriction on rotation of the cam body and the eccentric pin:

the cam follower moves along a second portion of the contoured cam surface of the cam body, and moves in a second axial direction opposite the first axial direction so as to release the compression of the compression spring, and the cam body and the eccentric pin are rotated by a third radial distance, the second and the third radial distance being substantially equal to the first radial distance.

5. The multi-directional compliant shifting mechanism of claim 1, wherein the movement of the selector to the second position comprises a movement of the selector from the first position to the second position, and, in response to the movement of the selector to the second position:

the selector and the shaft are rotated by a first radial distance, rotation of the cam body and the eccentric pin are physically restricted by the eccentric pin such that the cam body and the eccentric pin are rotated by a second radial distance that is less than the first radial distance, and the cam follower moves along a first portion of the contoured cam surface of the cam body, and moves in a first axial direction relative to the shaft so as to compress the compression spring.

6. The multi-directional compliant shifting mechanism of claim 5, wherein, in response to removal of the physical restriction on rotation of the cam body and the eccentric pin:

the cam follower moves along a second portion of the contoured cam surface of the cam body, and moves in a second axial direction relative to the shaft so as to release the compression of the compression spring, and the cam body and the eccentric pin are rotated by a third radial distance, the rotation by the third radial distance added to the rotation by the second radial distance being substantially equal to the first radial distance.

7. The multi-directional compliant shifting mechanism of claim 1, further comprising:

a plate positioned between the cam follower and the first end portion of the compression spring, so as to maintain contact between the cam follower and the contoured cam surface as the cam follower moves along the contoured cam surface of the cam body, wherein movement of the cam follower in a first direction along a first portion of the contoured surface of the cam body causes compression of the compression spring, and movement of the cam follower in the first direction along a second portion of the contoured surface of the cam body, adjacent to the first portion thereof, releases the compression of the compression spring.

8. The multi-directional compliant shifting mechanism of claim 7, wherein movement of the cam follower in a first direction along a first portion of the contoured surface of the cam body causes compression of the compression spring, and movement of the cam follower in a second direction, opposite the first direction, along the first portion of the contoured surface of the cam body releases the compression of the compression spring.

9. The multi-directional compliant shifting mechanism of claim 1, further comprising a retention device configured to selectively retain the movable selector in a selected one of the first position or the second position, the retention device including:

a spring loaded retention button movably received in a channel defined in the selector, the retention button including a body portion; a second spring coupled to a proximal end portion of the body portion received in the channel of the selector; and a retention flange provided at a distal end portion of the body portion, wherein the retention flange is configured to be movably received in a track defined in a housing of the tool, and to be retained in a first locking recess at a first end portion of the track so as to retain the selector in the first position, and to be retained in a second locking recess at a second end portion of the track so as to retain the selector in the second position.

10. A compliant shifting mechanism for a power tool having a multi-speed transmission, the compliant shifting mechanism comprising:

a shifter axially movable along a first axis between a first shifter position corresponding to a first gear ratio of a transmission of a power tool and a second shifter position corresponding to a second gear ratio of the transmission of the power tool;

a cam body rotatable about a second axis that is transverse to the first axis, the cam body including a cam surface and an eccentric pin coupled to the shifter so that rotation of the cam body about the second axis causes axial movement of the shifter along the first axis;

a cam follower that engages the cam surface and that moves rotationally about and axially along the second axis;

a single spring configured to bias the cam follower axially along the second axis toward the cam surface; and a selector movable by a user to cause the cam follower to rotate about the second axis, the selector movable between a first selector position corresponding to the first gear ratio and a second selector position corresponding to the second gear ratio, wherein, in response to movement of the selector from the first selector position to the second selector position, interaction of the cam body, the cam follower, and the single spring provides shifting compliance for movement of the shifter from the first shifter position to the second shifter position, and wherein, in response to movement of the selector from the second selector position to the first selector position, interaction of the cam body, the cam follower, and the single spring provides shifting compliance for movement of the shifter from the second shifter position to the first shifter position.

11. The compliant shifting mechanism of claim 10, wherein the second axis is substantially perpendicular to the first axis.

12. The compliant shifting mechanism of claim 10, further comprising a shaft coupling the selector to the cam follower and extending along the second axis.

13. The compliant shifting mechanism of claim 12, wherein the cam follower comprises a cross-pin transverse to the second axis and received through an axial slot in the shaft.

14. The compliant shifting mechanism of claim 10, wherein the selector is rotatable about the second axis between the first selector position and the second selector position.

15. A compliant shifting mechanism for a power tool having a multi-speed transmission, the compliant shifting mechanism comprising:

a shifter axially movable along a first axis between a first shifter position corresponding to a first gear ratio of a transmission of a power tool and a second shifter position corresponding to a second gear ratio of the transmission of the power tool;

a selector moveable by a user between a first selector position corresponding to user selection of the first gear ratio and a second shifter position corresponding to user selection of the second gear ratio; and a camming mechanism disposed between the selector and the shifter, the camming mechanism including a cam body with a cam surface movable together with one of the shifter and the selector, a cam follower moveable together with the other of the shifter and the selector to move selectively along the cam surface, and a single spring biasing the cam follower into engagement with the cam surface, the cam follower including a shaft and a cross-pin that is rotatably fixed and axially moveable relative to the shaft, wherein the single spring provides shifting compliance between the selector and the shifter when the selector is moved in a first direction from the first selector position to the second selector position to enable delayed movement of the shifter from the first shifter position to the second shifter position, and wherein the single spring also provides shifting compliance between the selector and the shifter when the selector is moved in a second direction from the second selector position to the first selector position to enable delayed movement of the shifter from the second shifter position to the first shifter position.

16. The compliant shifting mechanism of claim 15, further comprising an eccentric pin coupled to the cam body and configured to engage the shifter.

17. The compliant shifting mechanism of claim 15, wherein the cam follower comprises a cross-pin is transverse to and received through an axial slot in the shaft to rotate with the shaft and be axially moveable relative to the shaft.

18. The compliant shifting mechanism of claim 15, the selector is rotatable between the first selector position and the second selector position.

19. The compliant shifting mechanism of claim 15, wherein the cam body and the cam follower are rotatably moveable about a second axis that is transverse to the first axis.

* * * * *